US012107397B2

(12) United States Patent
Ishigami et al.

(10) Patent No.: US 12,107,397 B2
(45) Date of Patent: Oct. 1, 2024

(54) ELECTRIC DISCHARGE DEVICE AND ELECTRODE DEVICE

(71) Applicant: Panasonic Intellectual Property Management Co., Ltd., Osaka (JP)

(72) Inventors: Yohei Ishigami, Osaka (JP); Takafumi Omori, Shiga (JP); Tetsunori Aono, Shiga (JP); Sadahiko Wakaba, Shiga (JP); Takayuki Nakada, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 192 days.

(21) Appl. No.: 17/761,103

(22) PCT Filed: Jul. 16, 2020

(86) PCT No.: PCT/JP2020/027609

§ 371 (c)(1),
(2) Date: Mar. 16, 2022

(87) PCT Pub. No.: WO2021/059688

PCT Pub. Date: Apr. 1, 2021

(65) Prior Publication Data

US 2022/0344912 A1 Oct. 27, 2022

(30) Foreign Application Priority Data

Sep. 24, 2019 (JP) ................................ 2019-173517

(51) Int. Cl.
*H01T 19/00* (2006.01)

(52) U.S. Cl.
CPC .................................... *H01T 19/00* (2013.01)

(58) Field of Classification Search
CPC ......... H01T 19/00; H01T 19/04; H01T 23/00; B05B 5/0255; B05B 5/0533; B05B 5/057;
(Continued)

(56) References Cited

U.S. PATENT DOCUMENTS

2018/0029053 A1* 2/2018 Aono .................... B05B 5/0535
2018/0034248 A1* 2/2018 Ishigami ................ H01T 23/00
(Continued)

FOREIGN PATENT DOCUMENTS

CN 107528221 A 12/2017
JP 2007-313460 A 12/2007
(Continued)

OTHER PUBLICATIONS

International Search Report issued on Sep. 29, 2020 in International Application No. PCT/JP2020/027609, with English translation.
(Continued)

*Primary Examiner* — Zheng Song
*Assistant Examiner* — Glenn D Zimmerman
(74) *Attorney, Agent, or Firm* — Rimon P.C.

(57) ABSTRACT

An electric discharge device according to the present disclosure includes a discharge electrode, a counter electrode, a voltage application circuit, and a liquid supply unit. The discharge electrode is a columnar electrode. The counter electrode faces the discharge electrode. The voltage application circuit applies an application voltage between the discharge electrode and the counter electrode. The liquid supply unit supplies liquid to the discharge electrode. The liquid extends and contracts along a central axis of the discharge electrode by discharge. The counter electrode includes a peripheral electrode part and a projecting electrode part. In a direction along the central axis of the discharge electrode, a tip of the liquid in a state in which the liquid extends is located at the same position as an outer peripheral edge of the peripheral electrode part or located closer to the discharge electrode than the outer peripheral edge.

15 Claims, 9 Drawing Sheets

(58) Field of Classification Search
CPC ............ H05H 1/47; H05H 1/247; H05H 1/24; H05H 1/34; H05H 1/42
See application file for complete search history.

(56) References Cited

U.S. PATENT DOCUMENTS

| | | | | |
|---|---|---|---|---|
| 2018/0065104 | A1* | 3/2018 | Nakano | B05B 5/10 |
| 2020/0269263 | A1* | 8/2020 | Kikuchi | B05B 5/057 |
| 2020/0353488 | A1* | 11/2020 | Ishigami | B05B 5/057 |

FOREIGN PATENT DOCUMENTS

| | | | | | |
|---|---|---|---|---|---|
| JP | 2009-216284 | A | | 9/2009 | |
| JP | 2014-231047 | A | | 12/2014 | |
| JP | 2018-022574 | A | | 2/2018 | |
| JP | 2019046635 | A | * | 3/2019 | A61L 9/14 |
| TW | I443292 | B | | 7/2014 | |
| TW | 201808500 | A | | 3/2018 | |
| WO | WO-2009107515 | A1 | * | 9/2009 | B05B 5/0533 |
| WO | WO-2015056391 | A1 | * | 4/2015 | B05B 5/0255 |
| WO | 2018/025684 | A1 | | 2/2018 | |
| WO | WO-2019044272 | A1 | * | 3/2019 | A61L 9/14 |

OTHER PUBLICATIONS

Extended European Search Report dated Sep. 30, 2022 for the related European Patent Application No. 20869420.8.
The TW Search Report dated Jul. 4, 2024 for the related TW Patent Application No. 109124336.

* cited by examiner

ELECTRIC DISCHARGE DEVICE AND ELECTRODE DEVICE

CROSS-REFERENCE OF RELATED APPLICATIONS

This application is the U.S. National Phase under 35 U.S.C. § 371 of International Patent Application No. PCT/JP2020/027609, filed on Jul. 16, 2020, which in turn claims the benefit of Japanese Application No. 2019-173517, filed on Sep. 24, 2019, the entire disclosures of which Applications are incorporated by reference herein.

TECHNICAL FIELD

The present disclosure relates generally to an electric discharge device and an electrode device, and more particularly to an electric discharge device including a discharge electrode and a counter electrode, and an electrode device used in the electric discharge device.

BACKGROUND ART

PTL 1 describes an electric discharge device including a discharge electrode and a counter electrode, in which a voltage is applied between the discharge electrode and the counter electrode to generate discharge further developed from corona discharge. The discharge generated in the electric discharge device is discharge that intermittently generates a discharge path having dielectric breakdown so as to extend from the discharge electrode to the periphery. In the electric discharge device described in PTL 1, it is possible to increase a generation amount of an active ingredient as compared with corona discharge by generating discharge with high energy.

Further, PTL 1 describes that the counter electrode includes a needle-shaped electrode part facing the discharge electrode. As a result, the electric discharge device stably generates discharge that intermittently generates a discharge path between the discharge electrode and the needle-shaped electrode part.

CITATION LIST

Patent Literature

PTL 1: Unexamined Japanese Patent Publication No. 2018-22574

SUMMARY OF THE INVENTION

An object of the present disclosure is to provide an electric discharge device and an electrode device capable of further improving generation efficiency of an active ingredient.

An electric discharge device according to one aspect of the present disclosure includes a discharge electrode, a counter electrode, a voltage application circuit, and a liquid supply unit. The discharge electrode is a columnar electrode. The counter electrode faces the discharge electrode. The voltage application circuit generates discharge by applying an application voltage between the discharge electrode and the counter electrode. The liquid supply unit supplies liquid to the discharge electrode. The liquid expands and contracts along a central axis of the discharge electrode by discharge. The counter electrode includes a peripheral electrode part and a projecting electrode part. The peripheral electrode part protrudes to a side opposite to the discharge electrode, and an opening portion is formed on a distal end surface. The projecting electrode part projects from the peripheral electrode part into the opening portion. In a direction along the central axis of the discharge electrode, a tip of the liquid in a state in which the liquid extends is located at the same position as an outer peripheral edge of the peripheral electrode part or located closer to the discharge electrode than the outer peripheral edge.

An electrode device according to one aspect of the present disclosure is an electrode device used in the electric discharge device, and includes the discharge electrode and the counter electrode, and the application voltage is applied from the voltage application circuit.

An electric discharge device according to one aspect of the present disclosure includes a discharge electrode, a counter electrode, and a voltage application circuit. The discharge electrode is a columnar electrode. The counter electrode faces the discharge electrode. The voltage application circuit generates discharge by applying an application voltage between the discharge electrode and the counter electrode. The counter electrode includes a peripheral electrode part and a projecting electrode part. The peripheral electrode part protrudes to a side opposite to the discharge electrode, and an opening portion is formed on a distal end surface. The projecting electrode part projects from the peripheral electrode part into the opening portion. In a direction along the central axis of the discharge electrode, a tip of the discharge electrode is located closer to the discharge electrode than an outer peripheral edge of the peripheral electrode part.

According to the present disclosure, there is an advantage that the generation efficiency of the active ingredient can be further improved.

DESCRIPTION OF EMBODIMENTS

First Exemplary Embodiment

(1) Overview

Hereinafter, an overview of electric discharge device 10 and electrode device 3 according to the present exemplary embodiment will be described with reference to FIGS. 1A, 1B, and 2.

Figure 1A:
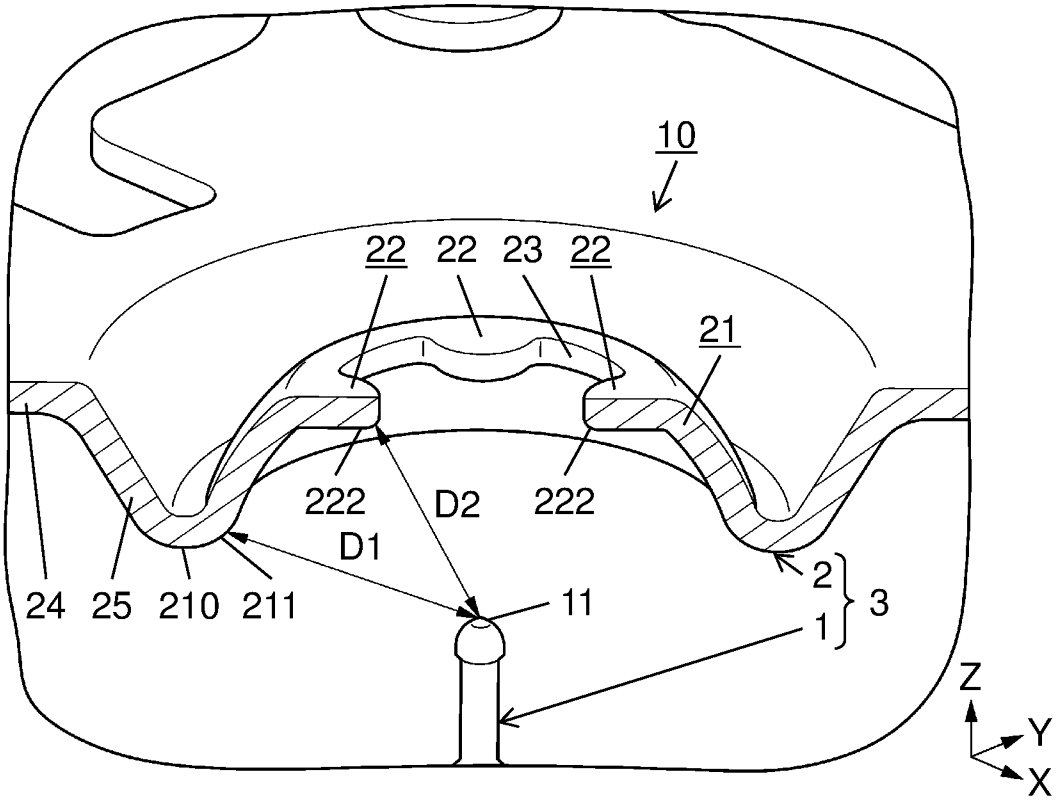
FIG. 1A is a partially broken perspective view schematically illustrating a main part of an electrode device in an electric discharge device according to a first exemplary embodiment.
Figure 1B:
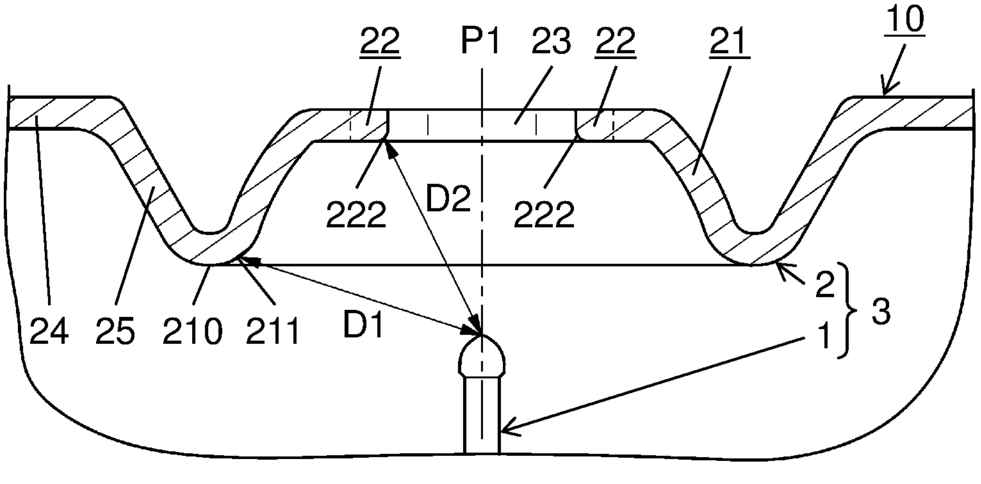
FIG. 1B is a cross-sectional view schematically illustrating the main part of the electrode device.

As illustrated in FIGS. 1A and 1B, electrode device 3 according to the present exemplary embodiment includes discharge electrode 1 and counter electrode 2. Electrode device 3 is configured to generate discharge when application voltage V1 (see FIG. 2) is applied between discharge electrode 1 and counter electrode 2.

Figure 2:
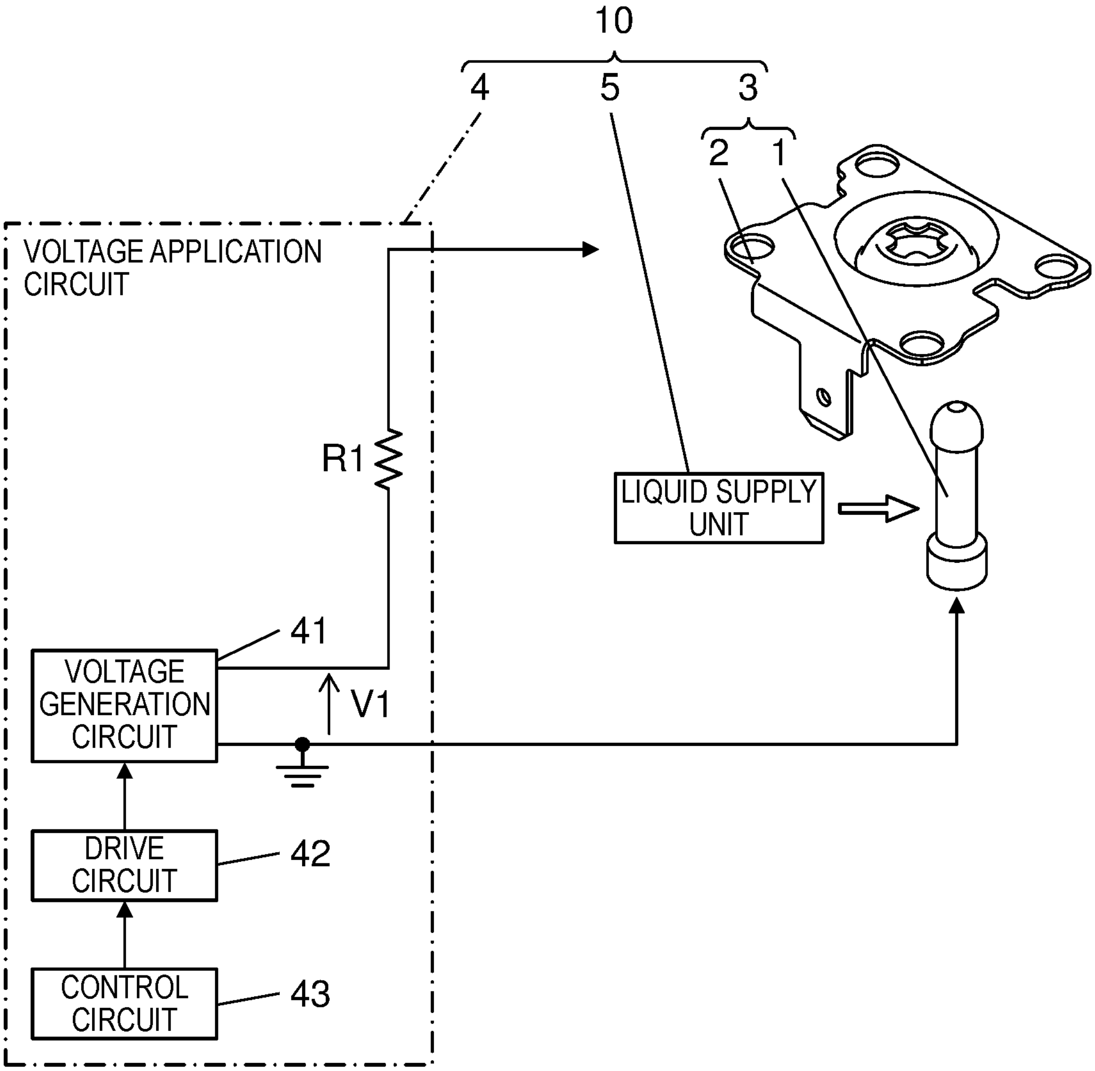
FIG. 2 is a block diagram of the electric discharge device.

As illustrated in FIG. 2, electrode device 3 constitutes electric discharge device 10 together with voltage application circuit 4 and liquid supply unit 5. In other words, electric discharge device 10 according to the present exemplary embodiment includes electrode device 3, voltage application circuit 4, and liquid supply unit 5. Voltage application circuit 4 generates discharge by applying application voltage V1 between discharge electrode 1 and counter electrode 2. Liquid supply unit 5 supplies liquid 50 (see FIG. 8A) to discharge electrode 1. Electric discharge device 10 generates an active ingredient by causing discharge in electrode device 3. The "active ingredient" in the present disclosure is an ingredient generated by discharge in electrode device 3, and means, for example, a charged microparticle liquid containing an OH radical, an OH radical, an O2 radical, a negative ion, a positive ion, ozone, or a nitrate ion. These active ingredients are not limited to sterile filtration, odor removal, moisture keeping, freshness keeping, or virus inactivation, and are the basis for providing useful effects in various situations.

In electric discharge device 10, liquid 50 is electrostatically atomized by discharge generated in electric discharge device 10. That is, for example, electric discharge device 10 applies a voltage from voltage application circuit 4 between discharge electrode 1 and counter electrode 2 in a state in which liquid 50 supplied from liquid supply unit 5 adheres to a surface of discharge electrode 1 to hold liquid 50 in discharge electrode 1. As a result, when discharge occurs between discharge electrode 1 and counter electrode 2, liquid 50 held by discharge electrode 1 is electrostatically atomized by the discharge. As described above, electric discharge device 10 according to the present exemplary embodiment constitutes an electrostatic atomization device (active ingredient generation system) that electrostatically atomizes liquid 50 by discharge to generate charged microparticle liquid as an active ingredient. In the present disclosure, liquid 50 held by discharge electrode 1, that is, liquid 50 to be electrostatically atomized is also simply referred to as "liquid 50".

In particular, in the present exemplary embodiment, voltage application circuit 4 intermittently generates discharge by periodically varying the magnitude of application voltage V1. When application voltage V1 periodically fluctuates, mechanical vibration occurs in liquid 50. The "application voltage" in the present disclosure means a voltage applied between discharge electrode 1 and counter electrode 2 by voltage application circuit 4 in order to cause discharge.

As will be described in detail later, when a voltage (application voltage V1) is applied between discharge electrode 1 and counter electrode 2, liquid 50 held by discharge electrode 1 receives a force of an electric field and forms a conical shape called a Taylor cone (see FIG. 8A). Then, the electric field concentrates on a tip portion (apex portion) of the Taylor cone, so that discharge occurs. At this time, as the tip portion of the Taylor cone becomes sharper, that is, as an apex angle of the cone becomes smaller (an acute angle), an electric field intensity required for dielectric breakdown becomes smaller, and discharge is likely to occur.

Liquid 50 held by discharge electrode 1 extends and contracts along central axis P1 (see FIG. 8B) of discharge electrode 1 in accordance with the mechanical vibration, and thus is alternately deformed into a first shape and a second shape. The first shape is a state in which liquid 50 extends along central axis P1 of discharge electrode 1, that is, a shape of the Taylor cone (see FIG. 8A). The second shape is a state in which liquid 50 contracts, that is, a shape in which a tip portion of the Taylor cone is crushed (see FIG. 8B). As a result, since the above-described Taylor cone is periodically formed, discharge is intermittently generated in accordance with the timing at which the Taylor cone is formed.

As described above, electric discharge device 10 according to the present exemplary embodiment includes discharge electrode 1, counter electrode 2, voltage application circuit 4, and liquid supply unit 5. As illustrated in FIGS. 1A and 1B, discharge electrode 1 is a columnar electrode. Counter electrode 2 faces discharge electrode 1. Voltage application circuit 4 generates discharge by applying application voltage V1 between discharge electrode 1 and counter electrode 2. Liquid supply unit 5 supplies liquid 50 to discharge electrode 1. Liquid 50 extends and contracts along central axis P1 of discharge electrode 1 by the discharge. Counter electrode 2 includes peripheral electrode part 21 and projecting electrode part 22. Peripheral electrode part 21 protrudes to a side opposite to discharge electrode 1. Opening portion 23 is formed in a distal end surface of peripheral electrode part 21. Projecting electrode part 22 projects from peripheral electrode part 21 into opening portion 23. In a direction along central axis P1 of discharge electrode 1, a tip of liquid 50 in the state in which liquid 50 extends is located at the same position as outer peripheral edge 210 of peripheral electrode part 21 or located closer to discharge electrode 1 than outer peripheral edge 210 (see FIG. 8A).

According to the configuration described above, when a voltage (application voltage V1) is applied between discharge electrode 1 and counter electrode 2, an electric field can concentrate on both peripheral electrode part 21 and projecting electrode part 22 in counter electrode 2 facing discharge electrode 1. However, since projecting electrode part 22 projects from peripheral electrode part 21 into opening portion 23, a degree of electric field concentration is higher in projecting electrode part 22 than in peripheral electrode part 21. Accordingly, when liquid 50 held by discharge electrode 1 is subjected to a force of the electric field to form the Taylor cone, for example, the electric field tends to concentrate between the tip portion (apex portion) of the Taylor cone and projecting electrode part 22. Therefore, discharge with relatively high energy occurs between liquid 50 and projecting electrode part 22, and corona discharge generated in liquid 50 held by discharge electrode 1 can be further developed to discharge with high energy. As a result, discharge path L1 (see FIG. 9B) is likely to be intermittently formed between discharge electrode 1 and counter electrode 2, discharge path L1 being at least partially broken due to dielectric breakdown, so that generation efficiency of the active ingredient is unlikely to decrease.

In addition, peripheral electrode part 21 protrudes to the side opposite to discharge electrode 1, and opening portion 23 is formed on the distal end surface of the peripheral electrode part. Therefore, a force that attracts liquid 50 to a side of peripheral electrode part 21 by the electric field acts on liquid 50 held by discharge electrode 1. In the direction along central axis P1 of discharge electrode 1, the tip of liquid 50 in the state in which liquid 50 extends is located at the same position as outer peripheral edge 210 of peripheral electrode part 21 or located closer to discharge electrode 1 than outer peripheral edge 210. As a result, when liquid 50 held by discharge electrode 1 mechanically vibrates, for example, a force in a direction attracting liquid 50 to peripheral electrode part 21 is continuously applied to the liquid, whereby an amplitude of liquid 50 can be suppressed to be small. That is, even in a state where liquid 50 is contracted, liquid 50 is applied with a bias in the direction in which liquid 50 is attracted to peripheral electrode part 21, so that liquid 50 does not have a completely collapsed shape, and an amount of deformation of liquid 50 due to the mechanical vibration of liquid 50 is suppressed to be small. As a result, a frequency of liquid 50 can be increased, and the generation efficiency of the active ingredient can be improved.

(2) Details

Hereinafter, details of electric discharge device 10 and electrode device 3 according to the present exemplary embodiment will be described with reference to FIGS. 1A to 9C.

Hereinafter, as an example, three axes of an X axis, a Y axis, and a Z axis orthogonal to each other are set, and in particular, an axis along central axis P1 of discharge electrode 1 is referred to as a "Z axis". Further, a side of counter electrode 2 as viewed from discharge electrode 1 is defined as a positive direction of the Z axis. The X axis, the Y axis, and the Z axis are all virtual axes, and arrows indicating "X", "Y", and "Z" in the drawings are merely described for the sake of description, and are not accompanied by entities. In addition, these directions are not intended to limit directions when electrode device 3 is used.

(2.1) Overall Configuration

As described above, electric discharge device 10 according to the present exemplary embodiment includes electrode device 3, voltage application circuit 4, and liquid supply unit 5 as illustrated in FIG. 2. Electric discharge device 10 according to the present exemplary embodiment includes electrode device 3 and voltage application circuit 4.

Electrode device 3 includes discharge electrode 1 and counter electrode 2. FIG. 2 schematically illustrates shapes of discharge electrode 1 and counter electrode 2. As described above, electrode device 3 generates discharge by applying a voltage between discharge electrode 1 and counter electrode 2.

As illustrated in FIGS. 1A and 1B, discharge electrode 1 is a columnar electrode extending along the Z axis. Discharge electrode 1 includes discharge part 11 at one end portion (tip portion) in a longitudinal direction (Z axis direction), and includes base end part 12 (see FIG. 5) at the other end portion (an end portion opposite to the tip portion) in the longitudinal direction. Discharge electrode 1 is a needle electrode in which at least discharge part 11 is formed in a tapered shape. The "tapered shape" as used herein is not limited to a shape in which the tip is sharply pointed, and includes a shape in which the tip is rounded as illustrated in FIG. 1A and the like.

Counter electrode 2 is disposed so as to face discharge part 11 of discharge electrode 1. As described above, counter electrode 2 includes peripheral electrode part 21 and projecting electrode part 22. Peripheral electrode part 21 is disposed so as to surround central axis P1 of discharge electrode 1 when viewed from one side of central axis P1 of discharge electrode 1. Projecting electrode part 22 projects from a part of peripheral electrode part 21 in a circumferential direction toward central axis P1 of discharge electrode 1 when viewed from one side (a positive side of the Z axis) of central axis P1 of discharge electrode 1.

Figure 3:
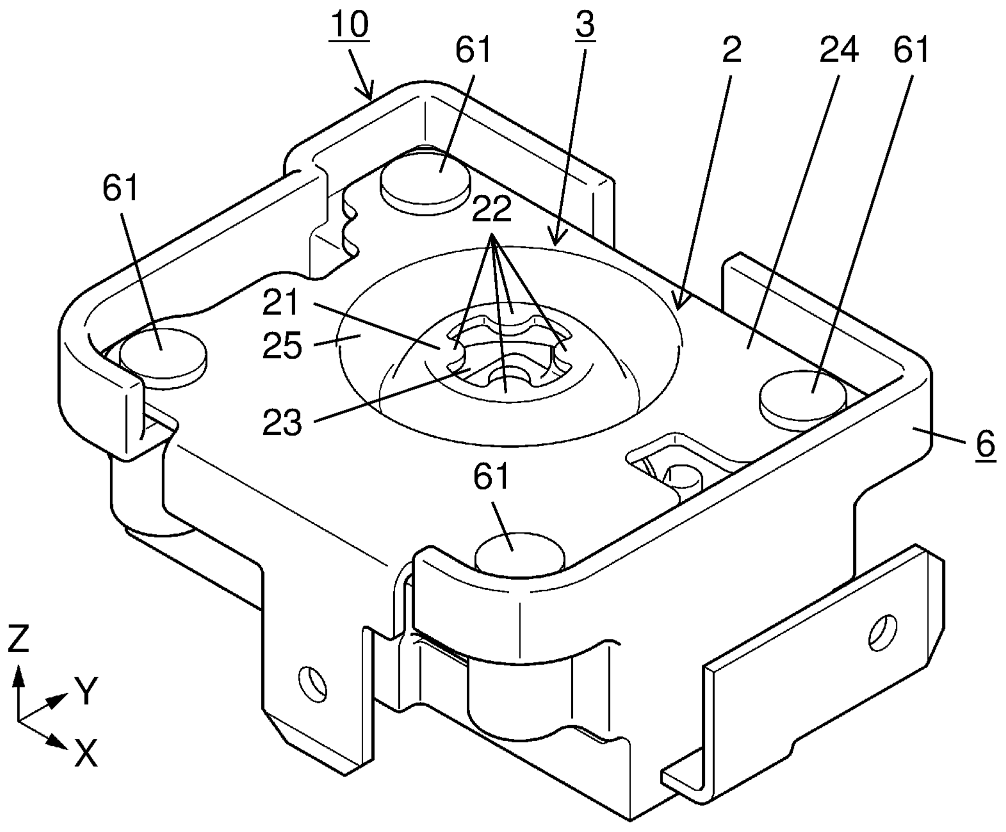
FIG. 3 is a schematic perspective view illustrating the main part of the electric discharge device.
Figure 4:
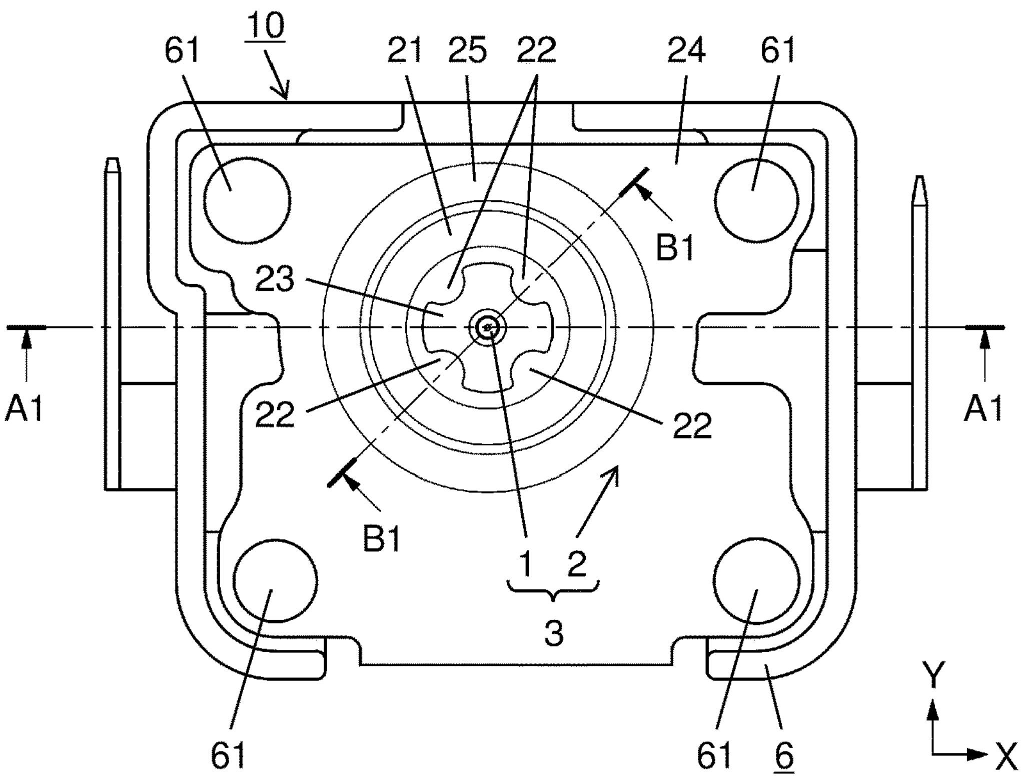
FIG. 4 is a schematic plan view illustrating a main part of the electric discharge device.
Figure 5:
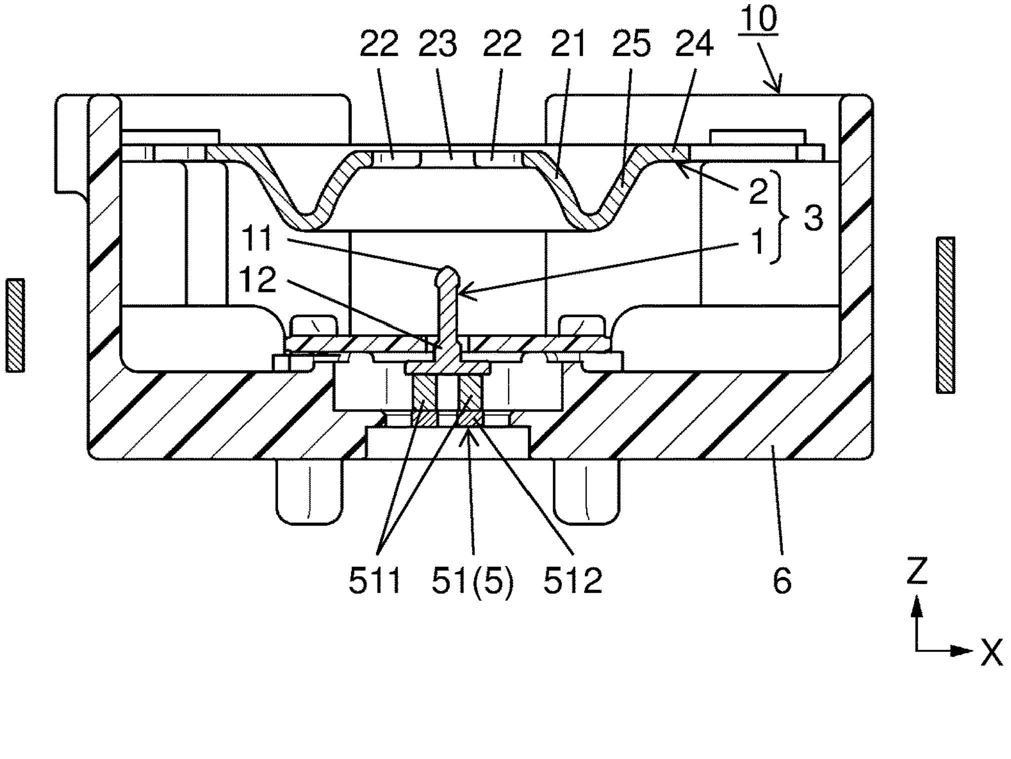
FIG. 5 is a cross-sectional view taken along line A1-A1 of FIG. 4, illustrating the main part of the electric discharge device.
Figure 6A:
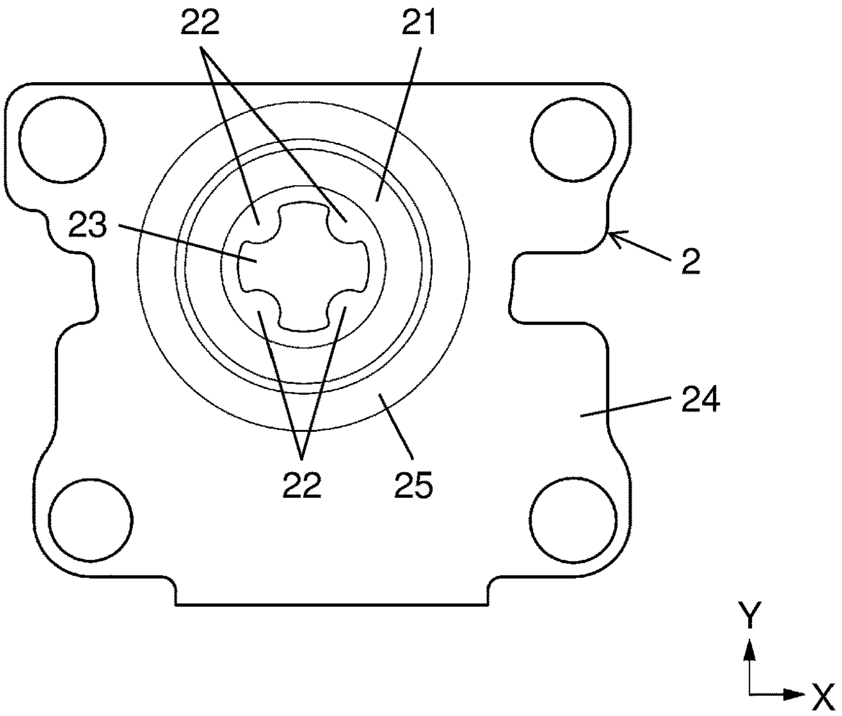
FIG. 6A is a plan view of a counter electrode of the electric discharge device.
Figure 6B:
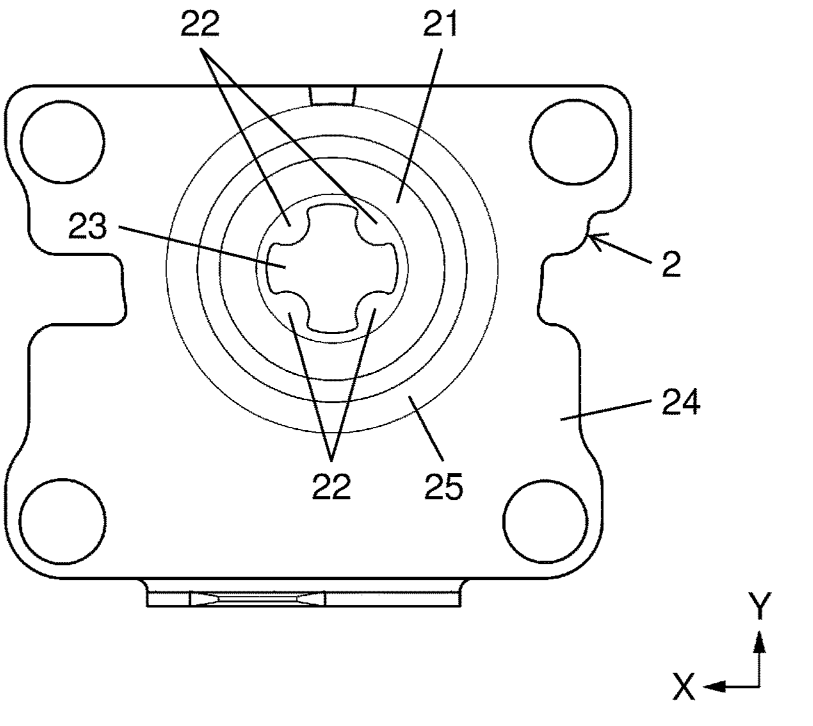
FIG. 6B is a bottom view of the counter electrode.

In the present exemplary embodiment, as illustrated in FIGS. 3 to 5, counter electrode 2 includes plate-shaped flat plate part 24 elongated in an X axis direction. As illustrated in FIG. 5, discharge electrode 1 and counter electrode 2 are separated from each other in the direction (Z axis direction) along central axis P1 of discharge electrode 1. In other words, as illustrated in FIG. 5, discharge electrode 1 and counter electrode 2 are in a positional relationship separated from each other in the direction (Z axis direction) along central axis P1 of discharge electrode 1.

Opening portion 23 penetrating flat plate part 24 in a thickness direction (the Z axis direction) of flat plate part 24 is formed in a part of flat plate part 24. In counter electrode 2, a part located around opening portion 23 is peripheral electrode part 21. A part projecting from peripheral electrode part 21 into opening portion 23 is projecting electrode part 22.

Discharge electrode 1 and counter electrode 2 are held by housing 6 made of a synthetic resin having electrical insulation properties. As an example, flat plate part 24 is caulked and coupled to housing 6 by thermal caulking or the like with a plurality of (here, four) caulking projections 61 (see FIG. 3) provided in housing 6. As a result, counter electrode 2 is held by housing 6.

A positional relationship between counter electrode 2 and discharge electrode 1 is determined such that a thickness direction of counter electrode 2 (a penetrating direction of opening portion 23) coincides with a longitudinal direction of discharge electrode 1 (the Z axis direction), and discharge part 11 of discharge electrode 1 is located near a center of opening portion 23 of counter electrode 2. That is, when viewed from one side (a positive side of the Z axis) of central axis P1 of discharge electrode 1, the center of opening portion 23 is located on central axis P1 of discharge electrode 1. That is, at least opening portion 23 of counter electrode 2 secures a gap (space) between counter electrode 2 and discharge electrode 1. In other words, counter electrode 2 is disposed so as to face discharge electrode 1 with a gap interposed therebetween, and is electrically insulated from discharge electrode 1.

A more detailed shape of discharge electrode 1 and counter electrode 2 in electrode device 3 will be described in a section of "(2.3) Electrode device".

Liquid supply unit 5 supplies liquid 50 for electrostatic atomization to discharge electrode 1. For example, liquid supply unit 5 is constructed with cooling device 51 that cools discharge electrode 1 to generate dew condensation water on discharge electrode 1. Specifically, as an example, as illustrated in FIG. 5, the cooling device 51 includes a plurality of (two in the illustrated example) Peltier elements 511 and heat sink 512. The plurality of Peltier elements 511 are mechanically and electrically connected to heat sink 512 by, for example, solder, and is held by heat sink 512. In each of the plurality of Peltier elements 511, one end portion (a side of heat sink 512) is set as a heat dissipation end, and the other end portion (an opposite side to heat sink 512) is set as a heat absorption end.

The plurality of Peltier elements 511 are mechanically connected to discharge electrode 1. Here, discharge electrode 1 is mechanically connected to cooling device 51 at base end part 12, and the plurality of Peltier elements 511 are mechanically connected to discharge electrode 1 at the heat absorption end. That is, discharge electrode 1 and cooling device 51 (the plurality of Peltier elements 511) are thermally coupled to each other.

In cooling device 51, discharge electrode 1 thermally coupled to Peltier elements 511 can be cooled by energizing the plurality of Peltier elements 511. At this time, cooling device 51 cools whole discharge electrode 1 through base end part 12. As a result, moisture in the air is condensed and adheres to a surface of discharge electrode 1 as dew condensation water. That is, liquid supply unit 5 is configured to cool discharge electrode 1 to generate dew condensation water as liquid 50 on the surface of discharge electrode 1. In this configuration, since liquid supply unit 5 can supply liquid 50 (dew condensation water) to discharge electrode 1 by using moisture in the air, supply and replenishment of the liquid to electric discharge device 10 become unnecessary.

Voltage application circuit 4 constitutes electric discharge device 10 together with electrode device 3 and liquid supply unit 5, and is a circuit that generates discharge by applying application voltage V1 between discharge electrode 1 and counter electrode 2 as described above.

As illustrated in FIG. 2, voltage application circuit 4 includes voltage generation circuit 41, drive circuit 42, and control circuit 43. Furthermore, voltage application circuit 4 further includes limiting resistor R1. Voltage generation circuit 41 is a circuit that receives power supply from a power supply and generates a voltage (application voltage V1) to be applied to electrode device 3. The "power supply" mentioned herein is a power supply that supplies power for operation to voltage generation circuit 41 and the like, and is, for example, a power supply circuit that generates a DC voltage of about several V to ten and several V. Drive circuit 42 is a circuit that drives voltage generation circuit 41. Control circuit 43 controls drive circuit 42 on the basis of a monitoring target, for example. The "monitoring target" mentioned herein includes at least one of an output current and an output voltage of voltage application circuit 4.

Voltage generation circuit 41 is, for example, a DC/DC converter, boosts an input voltage from a power supply, and outputs the boosted voltage as application voltage V1. The output voltage of voltage generation circuit 41 is applied to electrode device 3 (discharge electrode 1 and counter electrode 2) as application voltage V1.

Voltage generation circuit 41 is electrically connected to electrode device 3 (discharge electrode 1 and counter electrode 2). Voltage generation circuit 41 applies a high voltage to electrode device 3. Here, voltage generation circuit 41 is configured to apply a high voltage between discharge electrode 1 and counter electrode 2 with discharge electrode 1 as a negative electrode (ground) and counter electrode 2 as a positive electrode (plus). In other words, in a state in which a high voltage is applied from voltage application circuit 4 to electrode device 3, a potential difference is generated between discharge electrode 1 and counter electrode 2 such that discharge electrode 1 has a low potential and counter electrode 2 has a high potential. The term "high voltage" as used herein may be any voltage as long as the voltage is set so as to cause full path breakdown discharge or partial breakdown discharge to be described later in electrode device 3, and is, for example, a voltage having a peak of about 6.0 kV. The full path breakdown discharge and the partial breakdown discharge will be described in detail in a section of "(2.4) Mode of discharge". However, the high voltage applied from voltage application circuit 4 to electrode device 3 is not limited to about 6.0 kV, and is appropriately set according to, for example, the shapes of discharge electrode 1 and counter electrode 2, or the distance between discharge electrode 1 and counter electrode 2.

Furthermore, limiting resistor R1 is inserted between voltage generation circuit 41 and electrode device 3. In other words, voltage application circuit 4 includes voltage generation circuit 41 that generates application voltage V1, and limiting resistor R1 inserted between one output terminal of voltage generation circuit 41 and electrode device 3. Limiting resistor R1 is a resistor for limiting a peak value of a discharge current flowing after dielectric breakdown. That is, limiting resistor R1 has a function of protecting electrode device 3 and voltage application circuit 4 from overcurrent by limiting the current flowing through electrode device 3 at the time of discharge.

In the present exemplary embodiment, limiting resistor R1 is inserted between voltage generation circuit 41 and counter electrode 2. As described above, since counter electrode 2 is the positive electrode (plus), limiting resistor R1 is inserted between an output terminal on a high potential side of voltage generation circuit 41 and electrode device 3.

Here, an operation mode of voltage application circuit 4 includes two modes of a first mode and a second mode. The first mode is a mode for generating a discharge current by increasing application voltage V1 with the lapse of time, developing from corona discharge, and forming discharge path L1 with dielectric breakdown at least partially between discharge electrode 1 and counter electrode 2. The second mode is a mode for causing electrode device 3 to be in an overcurrent state, and cutting off the discharge current by control circuit 43 and the like. The "discharge current" in the present disclosure means a relatively large current flowing through discharge path L1, and does not include a minute current of about several μA generated in corona discharge before discharge path L1 is formed. The "overcurrent state" in the present disclosure means a state in which a load is lowered by discharge, and a current greater than or equal to an assumed value flows through electrode device 3.

In the present exemplary embodiment, control circuit 43 controls voltage application circuit 4 by controlling drive circuit 42. Control circuit 43 controls drive circuit 42 such that voltage application circuit 4 alternately repeats the first mode and the second mode during a drive period in which voltage application circuit 4 is driven. Here, control circuit 43 switches between the first mode and the second mode at a drive frequency so as to periodically vary the magnitude of application voltage V1 applied from voltage application circuit 4 to electrode device 3 at the drive frequency. The "drive period" in the present disclosure is a period during which voltage application circuit 4 is driven so as to cause discharge in electrode device 3.

That is, voltage application circuit 4 does not keep the magnitude of the voltage applied to electrode device 3 including discharge electrode 1 at a constant value, but periodically varies the voltage at a drive frequency within a predetermined range. Voltage application circuit 4 periodically varies the magnitude of application voltage V1 to cause intermittent discharge. That is, discharge path L1 is periodically formed in accordance with the variation cycle of application voltage V1, and discharge is periodically generated. Hereinafter, a cycle in which discharge (full path breakdown discharge or partial breakdown discharge) occurs is also referred to as a "discharge cycle". Accordingly, the magnitude of an electric energy acting on liquid 50 held by discharge electrode 1 periodically varies at the drive frequency, and as a result, liquid 50 held by discharge electrode 1 mechanically vibrates at the drive frequency.

Here, in order to increase a deformation amount of liquid 50, the drive frequency that is a frequency of the variation of application voltage V1 is preferably set to a value within a predetermined range including the resonance frequency (natural frequency) of liquid 50 held in discharge electrode 1, that is, a value near the resonance frequency of liquid 50. The "predetermined range" in the present disclosure is a range of frequencies in which mechanical vibration of liquid 50 is amplified when a force (an energy) applied to liquid 50 at the frequency is vibrated, and is a range in which a lower limit value and an upper limit value are defined based on the resonance frequency of liquid 50. That is, the drive frequency is set to a value near the resonance frequency of liquid 50. In this case, an amplitude of the mechanical vibration of liquid 50 caused by the variation in the magnitude of application voltage V1 becomes relatively large, and as a result, the deformation amount of liquid 50 caused by the mechanical vibration of liquid 50 becomes large. The resonance frequency of liquid 50 depends on, for example, the volume (amount), surface tension, viscosity, and the like of liquid 50.

That is, in electric discharge device 10 according to the present exemplary embodiment, liquid 50 vibrates with a relatively large amplitude by mechanically vibrating at a drive frequency near the resonance frequency. Therefore, liquid 50 has a shape in which the tip portion (apex portion) of the Taylor cone generated when the electric field acts is sharpened (acute angle). Therefore, as compared with a case where liquid 50 mechanically vibrates at a frequency away from its resonance frequency, the electric field intensity required for dielectric breakdown in a state where the Taylor cone is formed is reduced, and discharge is likely to occur. Therefore, for example, even if there is a variation in the magnitude of the voltage (application voltage V1) applied from voltage application circuit 4 to electrode device 3, a variation in the shape of discharge electrode 1, a variation in the amount (volume) of liquid 50 supplied to discharge electrode 1, or the like, discharge can be stably generated. In addition, voltage application circuit 4 can suppress the magnitude of the voltage applied to electrode device 3 including discharge electrode 1 to be relatively low. Therefore, a structure for insulation measures around electrode device 3 can be simplified, and the withstand voltage of components used for voltage application circuit 4 and the like can be reduced.

However, in the present exemplary embodiment, even in a state where liquid 50 is contracted, liquid 50 is biased in a direction in which liquid 50 is attracted to peripheral electrode part 21, so that the deformation amount of liquid 50 due to the mechanical vibration of liquid 50 is suppressed to be slightly small. Accordingly, electric discharge device 10 according to the present exemplary embodiment increases the frequency of liquid 50 to improve the generation efficiency of the active ingredient. The principle of increasing the frequency of liquid 50 will be described in detail in a section of "(2.5) Frequency of liquid".

(2.2) Operation

In electric discharge device 10 having the configuration described above, voltage application circuit 4 operates as follows, thereby causing discharge in electrode device 3 (discharge electrode 1 and counter electrode 2).

That is, in a period until discharge path L1 is formed, control circuit 43 sets an output voltage of voltage application circuit 4 as a monitoring target, and decreases an energy output from voltage generation circuit 41 when the monitoring target (output voltage) becomes greater than or equal to maximum value a. On the other hand, after discharge path L1 is formed, control circuit 43 sets an output current of voltage application circuit 4 as a monitoring target, and decreases the energy output from voltage generation circuit 41 when the monitoring target (output current) becomes greater than or equal to a threshold. As a result, voltage application circuit 4 operates in the second mode in which the voltage applied to electrode device 3 is lowered and electrode device 3 is brought into the overcurrent state to cut off the discharge current. That is, the operation mode of voltage application circuit 4 is switched from the first mode to the second mode.

At this time, since both the output voltage and the output current of voltage application circuit 4 decrease, control circuit 43 restarts the operation of drive circuit 42. As a result, the voltage applied to electrode device 3 increases with the lapse of time, develops from the corona discharge, and discharge path L1 in which dielectric breakdown is generated in at least a part is formed between discharge electrode 1 and counter electrode 2.

During the drive period, control circuit 43 repeats the above-described operation, whereby voltage application circuit 4 operates to alternately repeat the first mode and the second mode. As a result, the magnitude of the electric energy acting on liquid 50 held by discharge electrode 1 periodically varies at the drive frequency, and liquid 50 mechanically vibrates at the drive frequency.

In short, when a voltage is applied from voltage application circuit 4 to electrode device 3 including discharge electrode 1, a force due to an electric field acts on liquid 50 held by discharge electrode 1 to deform liquid 50. At this time, force F1 acting on liquid 50 held by discharge electrode 1 is expressed by a product of charge amount q1 contained in liquid 50 and electric field E1 (F1=q1×E1). In particular, in the present exemplary embodiment, since a voltage is applied between counter electrode 2 facing discharge part 11 of discharge electrode 1 and discharge electrode 1, a force in a direction pulled toward counter electrode 2 by an electric field acts on liquid 50. As a result, as illustrated in FIG. 8A, liquid 50 held by discharge part 11 of discharge electrode 1 receives the force of the electric field, extends toward counter electrode 2 along central axis P1 of discharge electrode 1 (that is, in the Z axis direction), and has a conical shape called a Taylor cone. When the voltage applied to electrode device 3 decreases from the state illustrated in FIG. 8A, the force acting on liquid 50 also decreases due to the influence of the electric field, and liquid

50 is deformed. As a result, as illustrated in FIG. 8B, liquid 50 held in discharge part 11 of discharge electrode 1 contracts.

Figure 8A:
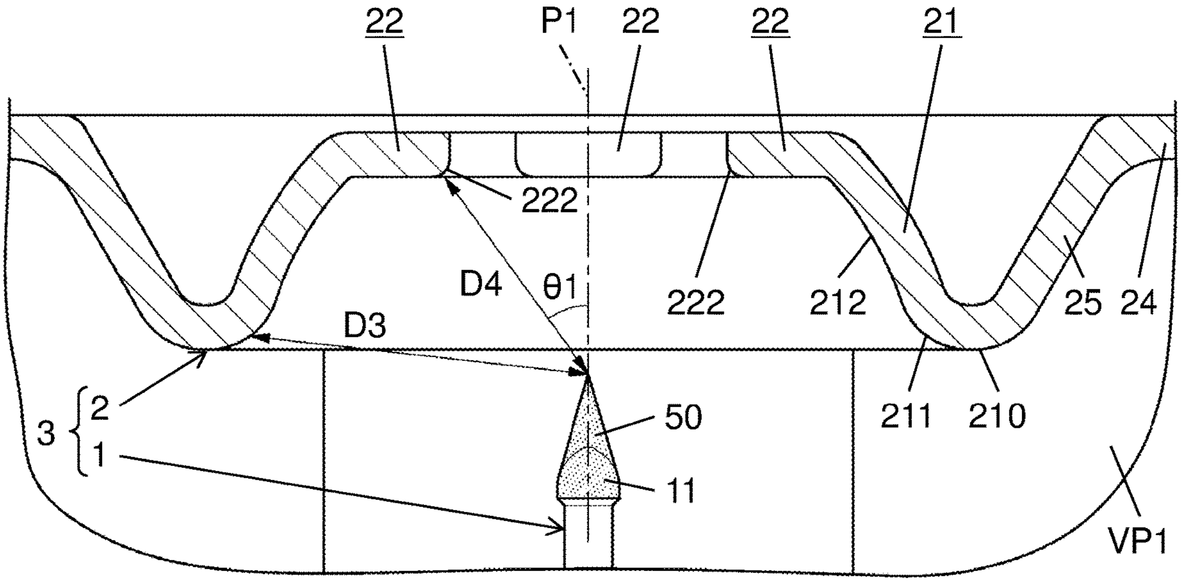
FIG. 8A is a cross-sectional view schematically illustrating the main part of the electrode device in a state in which a liquid extends.
Figure 8B:
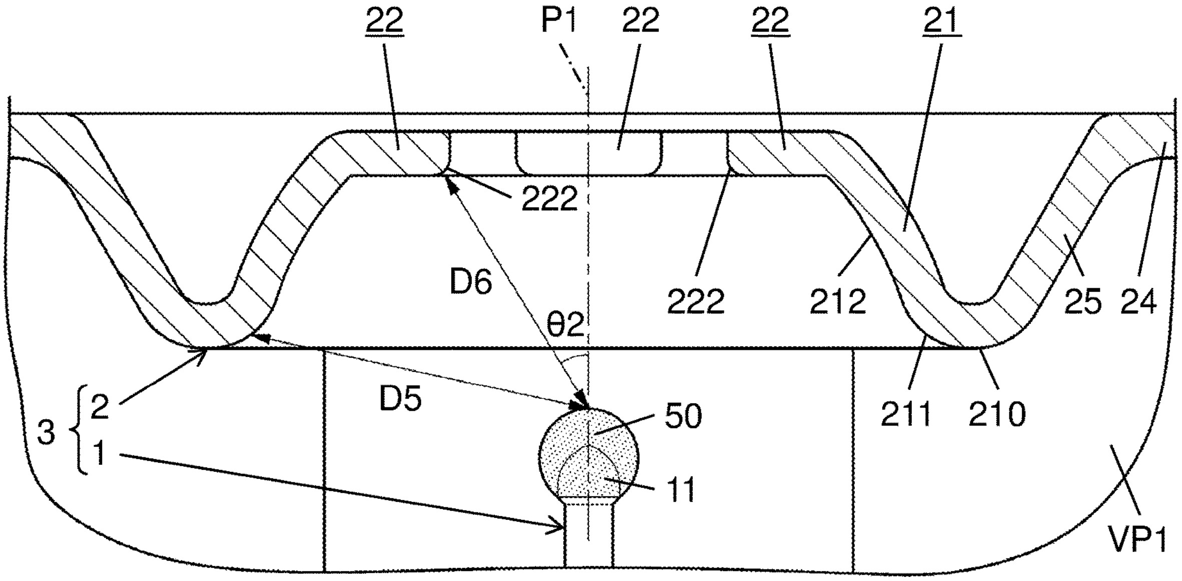
FIG. 8B is a cross-sectional view schematically illustrating the main part of the electrode device in a state in which the liquid is shrunk.

The magnitude of the voltage applied to electrode device 3 varies periodically at the drive frequency, so that liquid 50 held by discharge electrode 1 is alternately deformed into the shape illustrated in FIG. 8A and the shape illustrated in FIG. 8B. That is, in the present exemplary embodiment, discharge electrode 1 holds liquid 50 such that discharge part 11 is covered with liquid 50. Liquid 50 extends and contracts along central axis P1 of discharge electrode 1 (that is, in the Z axis direction) by the discharge. Since the electric field concentrates on the tip portion (apex portion) of the Taylor cone to generate discharge, dielectric breakdown occurs in a state where the tip portion of the Taylor cone is pointed as illustrated in FIG. 8A. Therefore, discharge (full path breakdown discharge or partial breakdown discharge) is intermittently generated in accordance with the drive frequency.

As a result, liquid 50 held by discharge electrode 1 is electrostatically atomized by discharge. As a result, in electric discharge device 10, an active ingredient composed of a charged microparticle liquid having a nanometer size and containing radicals is generated. The generated active ingredient (charged microparticle liquid) is discharged around electric discharge device 10 through, for example, opening portion 23 of counter electrode 2.

(2.3) Electrode Device

Next, a more detailed shape of electrode device 3 (discharge electrode 1 and counter electrode 2) used in electric discharge device 10 according to the present exemplary embodiment will be described with reference to FIGS. 1A, 1B, and 6A to 8B. FIGS. 1A, 1B, 8A, and 8B schematically illustrate main parts of discharge electrode 1 and counter electrode 2 constituting electrode device 3, and illustration of components other than discharge electrode 1 and counter electrode 2 is omitted as appropriate. FIG. 1A is a schematic perspective view taken along line B1-B1 in FIG. 4, and FIG. 1B is a schematic cross-sectional view taken along line B1-B1 in FIG. 4. FIGS. 6A to 7C are views illustrating only counter electrode 2.

That is, in the present exemplary embodiment, as described above, counter electrode 2 includes peripheral electrode part 21 and projecting electrode part 22. Peripheral electrode part 21 is disposed so as to surround central axis P1 of discharge electrode 1 when viewed from one side of central axis P1 of discharge electrode 1 (that is, when viewed from one side of the Z axis) (see FIG. 7A). Projecting electrode part 22 projects from a part in the circumferential direction of peripheral electrode part 21 toward central axis P1 of discharge electrode 1 when viewed from one side of central axis P1 of discharge electrode 1 (that is, when viewed from one side of the Z axis) (see FIG. 7A).

As an example, discharge electrode 1 is made of a conductive metal material such as a titanium alloy (Ti alloy). As illustrated in FIGS. 1A and 1B, discharge electrode 1 is a columnar electrode extending along the Z axis. Discharge electrode 1 includes discharge part 11 at one end portion (tip portion) in the longitudinal direction (Z axis direction).

In the present exemplary embodiment, discharge electrode 1 includes a distal end portion (discharge part 11) formed in a substantially hemispherical shape as a whole. In other words, a distal end surface of discharge electrode 1, that is, a surface facing counter electrode 2 in the Z axis direction includes a curved surface. In the present exemplary embodiment, a surface of discharge electrode 1 facing counter electrode 2 in the Z axis direction (a positive direction of the Z axis) is defined as discharge part 11. When liquid 50 is supplied to discharge electrode 1 by liquid supply unit 5, liquid 50 is held by discharge electrode 1 so as to cover at least discharge part 11 (see FIGS. 8A and 8B).

On the other hand, counter electrode 2 is made of, for example, a conductive metal material such as a titanium alloy (Ti alloy). In the present exemplary embodiment, counter electrode 2 includes plate-shaped flat plate part 24 as described above. As illustrated in FIGS. 6A to 7C, opening portion 23 penetrating flat plate part 24 in a thickness direction (the Z axis direction) of flat plate part 24 is formed in a part of flat plate part 24. In counter electrode 2, a part located around opening portion 23 is peripheral electrode part 21. A part projecting from peripheral electrode part 21 into opening portion 23 is projecting electrode part 22.

Further, counter electrode 2 is provided with extending part 25 extending outward from peripheral electrode part 21. That is, in electric discharge device 10 according to the present exemplary embodiment, counter electrode 2 further includes extending part 25 in addition to peripheral electrode part 21, projecting electrode part 22, and flat plate part 24.

Figure 7A:
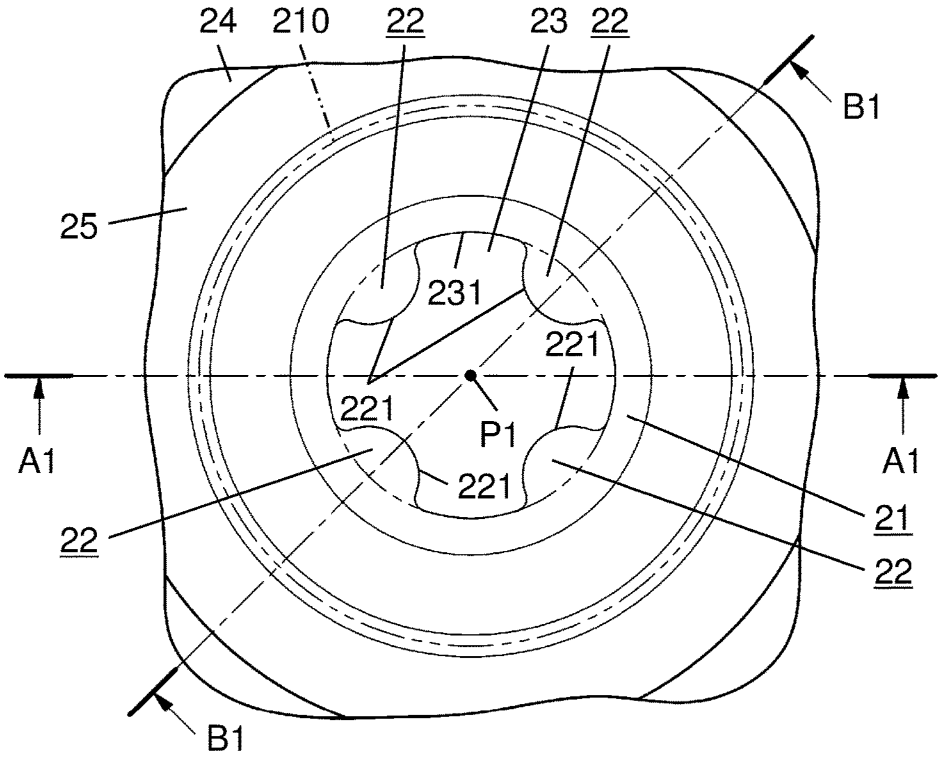
FIG. 7A is a plan view illustrating the main part of the counter electrode of the electrode device.
Figure 7B:
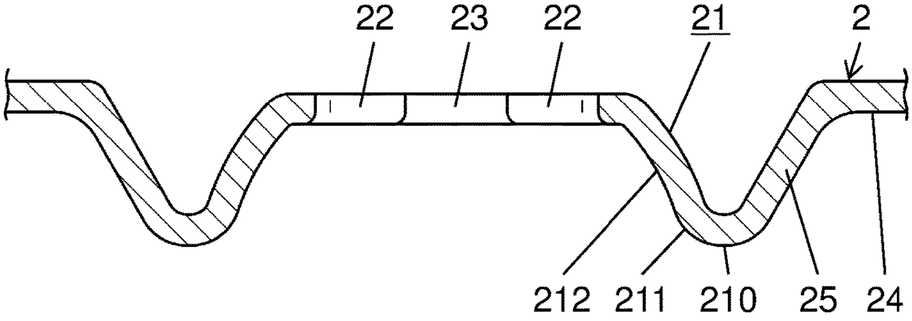
FIG. 7B is a cross-sectional view taken along line A1-A1 of FIG. 7A.
Figure 7C:
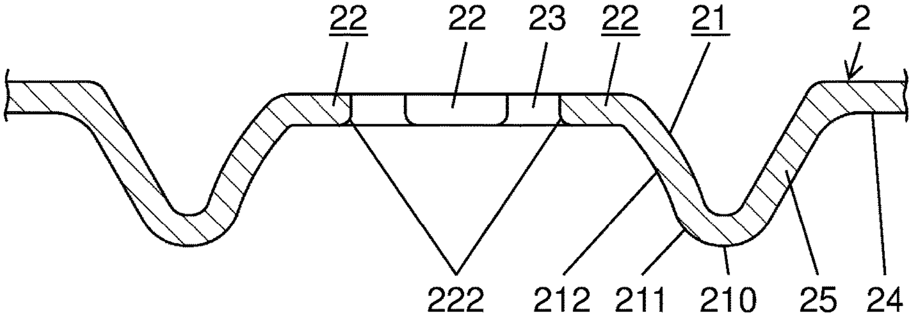
FIG. 7C is a cross-sectional view taken along line B1-B1 in FIG. 7A.

More specifically, dome-shaped peripheral electrode part 21, which projects in a direction away from discharge electrode 1 (a positive direction of the Z axis), in a direction along central axis P1 of discharge electrode 1 (the Z axis direction) is formed on a part of flat plate part 24. That is, peripheral electrode part 21 is convex to a side opposite to discharge electrode 1 (the positive side of the Z axis). As an example, peripheral electrode part 21 is formed in a hemispherical shell shape (dome shape) flat in the Z axis direction by recessing a part of flat plate part 24 by drawing. As illustrated in FIGS. 7B and 7C, peripheral electrode part 21 has inner surface 212 recessed to the side opposite to discharge electrode 1. Inner surface 212 is a tapered surface inclined with respect to central axis P1 of discharge electrode 1 such that an inner diameter of an end edge on a side of discharge electrode 1 in the Z axis direction is larger than an inner diameter of an end edge on the side opposite to discharge electrode 1.

Opening portion 23 is formed in a central portion of peripheral electrode part 21. Opening portion 23 is formed on a distal end surface of peripheral electrode part 21 which projects toward the side opposite to discharge electrode 1 (the positive side of the Z axis). Opening portion 23 opens in a circular shape and penetrates counter electrode 2 in the thickness direction (Z axis direction) of counter electrode 2. That is, peripheral electrode part 21 has opening portion 23 that opens in a circular shape. In FIG. 7A, inner peripheral edge 231 (that is, a peripheral edge of opening portion 23) and outer peripheral edge 210 of peripheral electrode part 21 are indicated by virtual lines (two-dot chain lines). In other words, in FIG. 7A, a region between the two concentric virtual lines (two-dot chain lines) is peripheral electrode part 21. The center of opening portion 23 is located on central axis P1 of discharge electrode 1.

Furthermore, projecting electrode part 22 projects from peripheral electrode part 21 into opening portion 23. Here, projecting electrode part 22 projects from inner peripheral edge 231 of peripheral electrode part 21 (that is, the peripheral edge of opening portion 23) toward the center of opening portion 23. In the present exemplary embodiment, a plurality of projecting electrode parts 22 are provided. That is, in the present exemplary embodiment, counter electrode 2 includes the plurality of projecting electrode parts 22.

Counter electrode 2 preferably includes greater than or equal to three projecting electrode parts 22. In the present exemplary embodiment, as an example, counter electrode 2 includes four projecting electrode parts 22. Since counter electrode 2 has greater than or equal to three projecting electrode parts 22 as described above, concentration of an electric field in projecting electrode parts 22 can be alleviated as compared with a case where projecting electrode parts 22 includes less than or equal to two projecting electrode parts. Each of the plurality of projecting electrode parts 22 projects from a part of peripheral electrode part 21 in the circumferential direction toward central axis P1 of discharge electrode 1.

Here, the plurality of (here, four) projecting electrode parts 22 are arranged at equal intervals in the circumferential direction of peripheral electrode part 21. That is, the plurality of projecting electrode parts 22 are arranged at equal intervals in the circumferential direction of opening portion 23. In the present exemplary embodiment, since counter electrode 2 includes four projecting electrode parts 22, four projecting electrode parts 22 are provided at positions that are rotationally symmetric by 90 degrees in the circumferential direction of peripheral electrode part 21 (the circumferential direction of opening portion 23). That is, the plurality of projecting electrode parts 22 are provided at point-symmetrical positions with the center of opening portion 23 as a symmetrical point (symmetrical center). In FIG. 7A, when the positive direction of the X axis (rightward) is defined as "0 degrees" and the positive direction of the Y axis (upward) is defined as "90 degrees", four projecting electrode parts 22 are respectively provided at positions of 45 degrees, 135 degrees, 225 degrees, and 315 degrees. As an example, opening portion 23 and the plurality of projecting electrode parts 22 are formed by punching.

Further, the plurality of (here, four) projecting electrode parts 22 have a common shape. In other words, the plurality of projecting electrode parts 22 have a shape that is rotationally symmetric by 90 degrees with respect to central axis P1 of discharge electrode 1. Therefore, a distance from discharge part 11 located on central axis P1 of discharge electrode 1 to projecting electrode part 22 is substantially uniform in the plurality of projecting electrode parts 22.

By the way, electrode device 3 according to the present exemplary embodiment is configured such that discharge path L1 is intermittently formed between discharge part 11 of discharge electrode 1 and projecting electrode part 22 of counter electrode 2, the discharge path being at least partially broken by dielectric breakdown, for the purpose of increasing an amount of generation of active ingredients. In this case, in order to reduce an amount of ozone generated, it is preferable to concentrate the electric field on a tip portion of projecting electrode part 22.

Therefore, for example, as illustrated in FIG. 7A, it is preferable that projecting electrode part 22 has an arc shape as a whole in a plan view. In other words, as viewed from one side of central axis P1 of discharge electrode 1 (that is, as viewed from one side of the Z axis), it is preferable that an entire outer peripheral edge of projecting electrode part 22 has an arc shape. The "arc shape" in the present disclosure is not limited to a shape that becomes a part of a perfect circle, and includes all shapes in which a tip is a rounded surface (curved surface) having substantially the same curvature radius. That is, as illustrated in FIG. 7A, distal end surface 221 of projecting electrode part 22 has an arc shape in a plan view. With such a shape, an electric field is not uniformly applied to entire distal end surface 221 of projecting electrode part 22 in a plan view, but the electric field is easily concentrated on an apex of distal end surface 221 of projecting electrode part 22 where a distance from discharge electrode 1 (in particular, discharge part 11) is shortest in a plan view. As a result, there is an advantage that the discharge between discharge part 11 and projecting electrode part 22 is easily stabilized.

In addition, when distal end surface 221 (vertex) of projecting electrode part 22 in a plan view is pointed, electric corrosion is likely to occur due to concentration of the electric field in this portion, and there is a possibility that a discharge state changes over time. Therefore, it is preferable that distal end surface 221 of projecting electrode part 22 in a plan view includes a curved surface such that the discharge state does not change with time.

Further, a degree of electric field concentration in counter electrode 2 varies depending on a shape of a surface of counter electrode 2 facing discharge electrode 1 (in particular, discharge part 11). In the present exemplary embodiment, a surface of counter electrode 2 facing discharge electrode 1 (in particular, discharge part 11) is formed into an R-surface (curved surface), so that electric field concentration at counter electrode 2 is slightly alleviated. Specifically, in counter electrode 2, at least one of the following four portions includes an R-surface. As illustrated in FIG. 7A, a first portion is distal end surface 221 of projecting electrode part 22 viewed from one side of central axis P1 of discharge electrode 1. As illustrated in FIG. 7C, a second portion is corner portion 222 of projecting electrode part 22 on a side of discharge electrode 1 in virtual plane VP1 (see FIG. 8A) including central axis P1 of discharge electrode 1 and the tip of projecting electrode part 22. As illustrated in FIG. 7C, a third portion is corner portion 211 of peripheral electrode part 21 on a side of discharge electrode 1 in virtual plane VP1. As illustrated in FIG. 7C, a fourth portion is inner surface 212 of peripheral electrode part 21 in virtual plane VP1. FIGS. 8A and 8B are cross-sectional views taken along virtual plane VP1 including central axis P1 of discharge electrode 1 and the tip of projecting electrode part 22.

In the present exemplary embodiment, all of these four portions include a curved shape. That is, distal end surface 221 of projecting electrode part 22 in a plan view, and corner portion 222, corner portion 211, and inner surface 212 in virtual plane VP1 all include a curved shape. Further, in the present exemplary embodiment, in addition to these four portions, inner peripheral edge 231 of peripheral electrode part 21 (a peripheral edge of opening portion 23) as viewed from one side of central axis P1 of discharge electrode 1 (in a plan view) also includes a curved shape.

Corner portion 211 of peripheral electrode part 21 includes a corner portion of peripheral electrode part 21 at a position closest to discharge part 11. In the present exemplary embodiment, corner portion 211 is an edge portion of inner surface 212 of peripheral electrode part 21 formed in a dome shape on a side of discharge electrode 1 in the Z axis direction. In other words, corner portion 211 is a corner portion between a surface (inner surface 212) of peripheral electrode part 21 facing central axis P1 of discharge electrode 1 and a surface facing a negative direction of the Z axis. Corner portion 211 is formed over the entire circumference in the circumferential direction of peripheral electrode part 21. Therefore, corner portion 211 has a circular shape centered on central axis P1 when viewed from one side of central axis P1 of discharge electrode 1. As a result, a distance from discharge part 11 located on central axis P1 of discharge electrode 1 to corner portion 211 becomes substantially uniform over the entire circumference of corner portion 211.

Corner portion 222 of projecting electrode part 22 is formed of a corner portion of projecting electrode part 22 at a position closest to discharge part 11. In the present exemplary embodiment, corner portion 222 is an edge on a side of discharge electrode 1 in the Z axis direction of an apex of projecting electrode part 22 formed in an arc shape in a plan view. In other words, corner portion 222 is a corner portion between a surface facing central axis P1 of discharge electrode 1 and a surface facing the negative direction of the Z axis in projecting electrode part 22. Here, a distance from discharge part 11 located on central axis P1 of discharge electrode 1 to corner portion 222 is substantially uniform in a plurality of (here, four) projecting electrode parts 22.

More specifically, these five portions are all formed in an arc shape. Among these five portions, inner surface 212 of peripheral electrode part 21 and inner peripheral edge 231 of peripheral electrode part 21 are convex to the side opposite to discharge part 11, that is, have an arc shape with a side of discharge part 11 as a concave surface. On the other hand, distal end surface 221 of projecting electrode part 22, corner portion 211 of peripheral electrode part 21, and corner portion 222 of projecting electrode part 22 each has an arc shape protruding toward discharge part 11. Curvature radii of the curved shapes of these five portions preferably satisfy the following magnitude relationship. That is, these five portions are arranged in the order of inner surface 212 of peripheral electrode part 21, inner peripheral edge 231 of peripheral electrode part 21, distal end surface 221 of projecting electrode part 22, corner portion 211 of peripheral electrode part 21, and corner portion 222 of projecting electrode part 22 from a side having the larger curvature radius.

In short, the radius of curvature of inner surface 212 of peripheral electrode part 21 is the largest. The curved shape of distal end surface 221 of projecting electrode part 22 is larger in radius of curvature than the curved shape of corner portion 222 of projecting electrode part 22 on a side of discharge electrode 1. That is, the radius of curvature of corner portion 222 of projecting electrode part 22 on the side of discharge electrode 1 in virtual plane VP1 is smaller than that of distal end surface 221 of projecting electrode part 22 in a plan view. The curved shape of distal end surface 221 of projecting electrode part 22 is smaller in radius of curvature than the curved shape of inner surface 212 of peripheral electrode part 21. That is, the radius of curvature of inner surface 212 of peripheral electrode part 21 in virtual plane VP1 is larger than that of distal end surface 221 of projecting electrode part 22 in a plan view. As an example, the radius of curvature of inner peripheral edge 231 of peripheral electrode part 21 is preferably greater than or equal to 2.0 mm and less than or equal to 5.0 mm More specifically, the radius of curvature of inner peripheral edge 231 of peripheral electrode part 21 is preferably less than or equal to 3.5 mm.

Extending part 25 is a part extending outward from peripheral electrode part 21. As illustrated in FIGS. 7B and 7C, extending part 25 is formed so as to be more distant from discharge electrode 1 in the direction along central axis P1 of discharge electrode 1 with increasing a distance from peripheral electrode part 21. In the present exemplary embodiment, extending part 25 is located around peripheral electrode part 21 and connects flat plate part 24 and peripheral electrode part 21. That is, when viewed from one side (in a plan view) of central axis P1 of discharge electrode 1, peripheral electrode part 21 and extending part 25 are formed concentrically around central axis P1. With respect to an inner peripheral portion connected to peripheral electrode part 21, outer peripheral portion connected to flat plate part 24 of extending part 25 is located on a side opposite to discharge electrode 1 in the direction along central axis P1 of discharge electrode 1, that is, on the positive side of the Z axis. In other words, extending part 25 is inclined with respect to central axis P1 of discharge electrode 1 such that an inner diameter of an end edge on a side of discharge electrode 1 in the Z axis direction is smaller than an inner diameter of an end edge on a side opposite to discharge electrode 1 (a side of flat plate part 24).

Therefore, as illustrated in FIGS. 7B and 7C, counter electrode 2 is formed in a shape extending in the negative direction of the Z axis from opening portion 23 toward an outer peripheral side (a side of flat plate part 24) and further extending in the positive direction of the Z axis from the distal end thereof. As a result, in counter electrode 2, a recess (groove) having a substantially V-shaped cross section recessed in the negative direction of the Z axis is formed around opening portion 23 over the entire circumference of opening portion 23. As an example, extending part 25 is formed together with peripheral electrode part 21 by recessing a part of flat plate part 24 by drawing.

Since counter electrode 2 has such extending part 25, a portion other than peripheral electrode part 21 and projecting electrode part 22 of counter electrode 2 can be moved away from discharge electrode 1 (in particular, discharge part 11). In short, by keeping a portion of counter electrode 2 outside outer peripheral edge 210 of peripheral electrode part 21 away from discharge electrode 1 in the Z axis direction, it is possible to suppress generation of an unnecessary electric field between discharge electrode 1 and extending part 25 or flat plate part 24. As a result, an electric field can be efficiently generated between discharge electrode 1 and peripheral electrode part 21 and projecting electrode part 22 of counter electrode 2.

As illustrated in FIGS. 1A and 1B, distance D1 from peripheral electrode part 21 to discharge electrode 1 is greater than or equal to distance D2 from projecting electrode part 22 to discharge electrode 1 (D1≥D2). Preferably, distance D1 from peripheral electrode part 21 to discharge electrode 1 is longer than distance D2 from projecting electrode part 22 to discharge electrode 1.

"Distance D1" in the present disclosure means the shortest distance from peripheral electrode part 21 to discharge electrode 1, and in the present exemplary embodiment, distance D1 is a length of a line segment connecting one point of corner portion 211 of peripheral electrode part 21 and one point of discharge part 11. "Distance D2" in the present disclosure means a shortest distance from projecting electrode part 22 to discharge electrode 1, and in the present exemplary embodiment, distance D2 is a length of a line segment connecting one point of corner portion 222 of projecting electrode part 22 and one point of discharge part 11. That is, distance D1 from peripheral electrode part 21 to discharge part 11 is a distance from corner portion 211 to discharge part 11. Distance D2 from projecting electrode part 22 to discharge part 11 is a distance from corner portion 222 to discharge part 11.

Furthermore, in the present exemplary embodiment, as described above, discharge electrode 1 holds liquid 50 so as to cover discharge part 11, and liquid 50 extends and contracts along central axis P1 of discharge electrode 1 (that is, in the Z axis direction) by the discharge. In a state where liquid 50 extends along central axis P1 of discharge electrode 1, liquid 50 has a shape of a Taylor cone (first shape) as illustrated in FIG. 8A. On the other hand, in a state where liquid 50 is contracted, as illustrated in FIG. 8B, liquid 50 has a shape in which the tip portion of the Taylor cone is crushed (second shape).

Then, as illustrated in FIG. 8A, when liquid 50 is in an extended state (first shape), distances from peripheral electrode part 21 and projecting electrode part 22 are preferably defined as follows with reference to liquid 50 instead of discharge part 11. That is, as illustrated in FIG. 8A, distance D3 from liquid 50 to peripheral electrode part 21 in a state where liquid 50 extends is greater than or equal to distance D4 from liquid 50 to projecting electrode part 22 (D3≥D4).

"Distance D3" in the present disclosure means the shortest distance from liquid 50 in the extended state to peripheral electrode part 21, and in the present exemplary embodiment, distance D3 is a length of a line segment connecting one point of corner portion 211 of peripheral electrode part 21 and the vertex of liquid 50 having the first shape. "Distance D4" in the present disclosure means the shortest distance from liquid 50 in the extended state to projecting electrode part 22, and in the present exemplary embodiment, distance D4 is a length of a line segment connecting one point of corner portion 222 of projecting electrode part 22 and the vertex of liquid 50 having the first shape. That is, distance D3 from liquid 50 to peripheral electrode part 21 is a distance from corner portion 211 to liquid 50 having the first shape (Taylor cone). Distance D4 from liquid 50 to projecting electrode part 22 is a distance from corner portion 222 to liquid 50 having the first shape (Taylor cone).

In virtual plane VP1 including central axis P1 of discharge electrode 1 and the tip of projecting electrode part 22, inclination angle θ1 of a virtual line connecting liquid 50 and the tip of projecting electrode part 22 with respect to central axis P1 of discharge electrode 1 is less than or equal to 67 degrees. The "virtual line connecting liquid 50 and the tip of projecting electrode part 22" mentioned herein means the shortest distance from liquid 50 in the extended state to projecting electrode part 22, and is a line segment (an arrow indicating distance D4 in FIG. 8A) connecting one point of corner portion 222 of projecting electrode part 22 and the vertex of liquid 50 having the first shape.

Further, as illustrated in FIG. 8B, when liquid 50 is in a contracted state (second shape), distances from peripheral electrode part 21 and projecting electrode part 22 are preferably defined as follows with reference to liquid 50 instead of discharge part 11. That is, as illustrated in FIG. 8B, distance D5 from liquid 50 to peripheral electrode part 21 in a state where liquid 50 contracts is greater than or equal to distance D6 from liquid 50 to projecting electrode part 22 (D5≥D6).

"Distance D5" in the present disclosure means the shortest distance from liquid 50 in the contracted state to peripheral electrode part 21, and in the present exemplary embodiment, distance D5 is a length of a line segment connecting one point of corner portion 211 of peripheral electrode part 21 and the vertex of liquid 50 having the second shape. "Distance D6" in the present disclosure means the shortest distance from liquid 50 in the contracted state to projecting electrode part 22, and in the present exemplary embodiment, distance D6 is a length of a line segment connecting one point of corner portion 222 of projecting electrode part 22 and the vertex of liquid 50 having the second shape. That is, distance D5 from liquid 50 to peripheral electrode part 21 is a distance from corner portion 211 to liquid 50 having the second shape (a shape in which the tip portion of the Taylor cone is crushed). Distance D6 from liquid 50 to projecting electrode part 22 is a distance from corner portion 222 to liquid 50 having the second shape (the shape in which the tip portion of the Taylor cone is crushed).

In virtual plane VP1 including central axis P1 of discharge electrode 1 and the tip of projecting electrode part 22, inclination angle θ2 of a virtual line connecting liquid 50 and the tip of projecting electrode part 22 with respect to central axis P1 of discharge electrode 1 is less than or equal to 67 degrees. The "virtual line connecting liquid 50 and the tip of projecting electrode part 22" mentioned herein means the shortest distance from liquid 50 in the contracted state to projecting electrode part 22, and is a line segment (an arrow indicating distance D6 in FIG. 8B) connecting one point of corner portion 222 of projecting electrode part 22 and the vertex of liquid 50 having the second shape.

As described above, in the present exemplary embodiment, distance (D4 or D6) from liquid 50 to projecting electrode part 22 is less than or equal to distance (D3 or D5) from liquid 50 to peripheral electrode part 21. Further, in the present exemplary embodiment, the distance from liquid 50 to projecting electrode part 22 is shorter than the distance from liquid 50 to peripheral electrode part 21 (D4<D3 or D6<D5). More specifically, distance (D4 or D6) from liquid 50 to projecting electrode part 22 is preferably less than or equal to 9/10 of distance (D3 or D5) from liquid 50 to peripheral electrode part 21.

Further, in virtual plane VP1 including central axis P1 of discharge electrode 1 and the tip of projecting electrode part 22, inclination angles θ1, θ2 of the virtual lines connecting liquid 50 and the tip of projecting electrode part 22 with respect to central axis P1 of discharge electrode 1 are less than or equal to 67 degrees. Inclination angles θ1, θ2 of the virtual lines with respect to central axis P1 of discharge electrode 1 are more preferably less than or equal to 65 degrees, and more preferably less than or equal to 62 degrees.

Here, a magnitude relationship between distances D3 to D6, and inclination angles θ1 and θ2 described above are preferably established in both a state in which liquid 50 extends (first shape) as illustrated in FIG. 8A and a state in which liquid 50 contracts (second shape) as illustrated in FIG. 8B.

Electrode device 3 according to the present exemplary embodiment has the following advantages by adopting the relationship of distances D1 to D6 as described above. That is, since distance D1 from peripheral electrode part 21 to discharge part 11 is greater than or equal to distance D2 from projecting electrode part 22 to discharge part 11, when a voltage is applied between discharge electrode 1 and counter electrode 2, first, an electric field acting between projecting electrode part 22 and discharge part 11 becomes dominant. At this time, corona discharge is likely to occur. Therefore, glow discharge or arc discharge in which dielectric breakdown is continuously generated is less likely to occur, and reduction in the generation efficiency of the active ingredients due to glow discharge or arc discharge is less likely to occur.

Further, when liquid 50 held by discharge electrode 1 is subjected to a force by the electric field to form the Taylor cone, distance D3 from liquid 50 (in an extended state) to peripheral electrode part 21 at this time is longer than distance D4 from liquid 50 to projecting electrode part 22. Therefore, the electric field tends to concentrate between the tip portion (apex portion) of the Taylor cone and projecting electrode part 22. Therefore, discharge with relatively high energy occurs between liquid 50 and projecting electrode part 22, and corona discharge generated in liquid 50 held by discharge electrode 1 can be further developed to discharge with high energy. As a result, discharge path L1 whose dielectric breakdown is at least partially formed is formed between discharge electrode 1 and counter electrode 2.

However, in FIGS. 8A and 8B, liquid 50 in a stable state of electric discharge device 10 is intended. The term "stable state" as used in the present disclosure means a state in which an amount of liquid 50 held by discharge electrode 1 is kept substantially constant. That is, the amount of liquid 50 supplied from liquid supply unit 5 to discharge electrode 1 and the amount of liquid 50 electrostatically atomized and discharged from electric discharge device 10 are substantially balanced, so that the amount of liquid 50 becomes a substantially constant stable state. Any of distances D3 to D6 described above is defined based on liquid 50 in such a stable state.

In the present exemplary embodiment, as described above, in the direction along central axis P1 of discharge electrode 1, the tip of liquid 50 in the state in which liquid 50 extends is located at the same position as outer peripheral edge 210 of peripheral electrode part 21 or located closer to discharge electrode 1 than outer peripheral edge 210 (see FIG. 8A). That is, as illustrated in FIG. 8A, an apex (tip) of liquid 50 in a state (first shape) in which liquid 50 extends is identical to outer peripheral edge 210 of peripheral electrode part 21 in the Z axis direction, or is located closer to discharge electrode 1 (the negative side of the Z axis) than outer peripheral edge 210. That is, assuming a plane that is orthogonal to the Z axis and includes outer peripheral edge 210 of peripheral electrode part 21, the vertex (tip) of liquid 50 having the first shape is located in this plane or on the negative side of the Z axis with respect to this plane.

According to this configuration, a force that attracts liquid 50 toward peripheral electrode part 21 by the electric field can be always applied to liquid 50 held by discharge electrode 1. In short, peripheral electrode part 21 and projecting electrode part 22 of counter electrode 2 on which the electric field acts with liquid 50 are always located on the positive side of the Z axis as viewed from liquid 50, and a force for attracting liquid 50 in the positive direction of the Z axis can be always applied. Therefore, when liquid 50 held by discharge electrode 1 is mechanically vibrated, for example, a force in a direction attracting liquid 50 to peripheral electrode part 21 is continuously applied to the liquid, whereby the amplitude of liquid 50 can be suppressed to be small. That is, even in a state where liquid 50 is contracted, liquid 50 is applied with a bias in the direction in which liquid 50 is attracted to peripheral electrode part 21, so that liquid 50 does not have a completely collapsed shape, and an amount of deformation of liquid 50 due to the mechanical vibration of liquid 50 is suppressed to be small. As a result, a frequency of liquid 50 can be increased, and the generation efficiency of the active ingredient can be improved.

Further, as illustrated in FIGS. 1A and 1B, in a state where there is no liquid 50, a configuration of electric discharge device 10 according to the present exemplary embodiment is expressed as follows. That is, electric discharge device 10 according to the present exemplary embodiment includes discharge electrode 1, counter electrode 2, and voltage application circuit 4. Discharge electrode 1 is a columnar electrode. Counter electrode 2 faces discharge electrode 1. Voltage application circuit 4 generates discharge by applying application voltage V1 between discharge electrode 1 and counter electrode 2. Counter electrode 2 includes peripheral electrode part 21 and projecting electrode part 22. Peripheral electrode part 21 protrudes to a side opposite to discharge electrode 1. Opening portion 23 is formed in a distal end surface of peripheral electrode part 21. Projecting electrode part 22 projects from peripheral electrode part 21 into opening portion 23. In the direction along central axis P1 of discharge electrode 1, the tip of discharge electrode 1 is located closer to discharge electrode 1 than outer peripheral edge 210 of peripheral electrode part 21.

As described above, even when the tip of discharge electrode 1 is located closer to discharge electrode 1 than outer peripheral edge 210 of peripheral electrode part 21 in the direction along central axis P1 of discharge electrode 1, the same effect as described above can be expected. That is, a force that attracts liquid 50 toward peripheral electrode part 21 by the electric field can be always applied to liquid 50 held by discharge electrode 1. As a result, a frequency of liquid 50 can be increased, and the generation efficiency of the active ingredient can be improved.

(2.4) Mode of Discharge

Figure 9A:
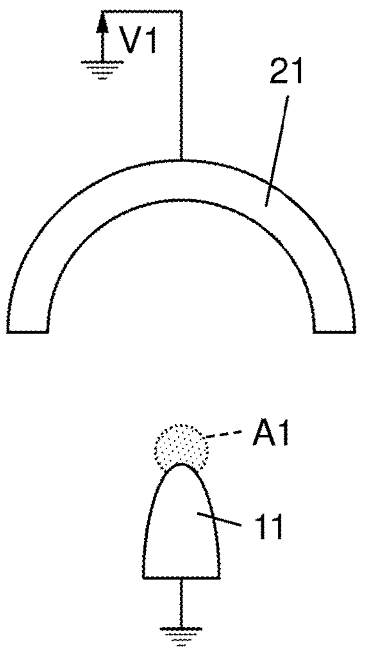
FIG. 9A is a schematic diagram illustrating a discharge mode of corona discharge.
Figure 9B:
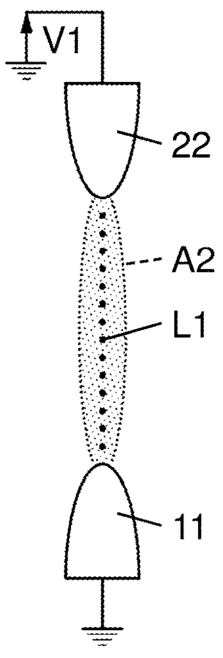
FIG. 9B is a schematic diagram illustrating a discharge mode of a full path breakdown discharge.
Figure 9C:
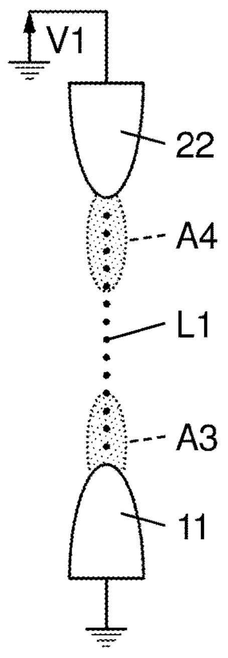
FIG. 9C is a schematic diagram illustrating a discharge mode of a partial breakdown discharge.

Hereinafter, details of a discharge form generated when application voltage V1 is applied between discharge electrode 1 and counter electrode 2 will be described with reference to FIGS. 9A to 9C. FIGS. 9A to 9C are conceptual diagrams for describing a discharge form, and FIGS. 9A to 9C schematically illustrate discharge electrode 1 and counter electrode 2. In electric discharge device 10 according to the present exemplary embodiment, liquid 50 is actually held in discharge electrode 1, and discharge occurs between liquid 50 and counter electrode 2. However, liquid 50 is not illustrated in FIGS. 9A to 9C. In the following description, it is assumed that there is no liquid 50 in discharge part 11 of discharge electrode 1. However, in a case where there is liquid 50, "discharge part 11 of discharge electrode 1" may be replaced with "liquid 50 held in discharge electrode 1" with respect to a place where the discharge occurs or the like.

Here, first, corona discharge will be described with reference to FIG. 9A.

In general, when energy is input between a pair of electrodes to generate discharge, the discharge form progresses from corona discharge to glow discharge or arc discharge according to an amount of the input energy.

The glow discharge and the arc discharge are discharges accompanied by dielectric breakdown between the pair of electrodes. In the glow discharge and the arc discharge, a discharge path formed by dielectric breakdown is maintained while the energy is input between the pair of electrodes, and a discharge current is continuously generated between the pair of electrodes. On the other hand, as illustrated in FIG. 9A, the corona discharge is discharge locally generated at one electrode (discharge electrode 1), and is discharge without dielectric breakdown between the pair of electrodes (discharge electrode 1 and counter electrode 2). In short, when application voltage V1 is applied between discharge electrode 1 and counter electrode 2, local corona discharge occurs in discharge part 11 of discharge electrode 1. Here, since discharge electrode 1 is on the negative electrode (ground) side, the corona discharge generated in discharge part 11 of discharge electrode 1 is a negative corona. At this time, region A1 locally subjected to dielectric breakdown may be generated around discharge part 11 of discharge electrode 1. Region A1 does not have a shape elongated in a specific direction as in each of first dielectric breakdown region A3 and second dielectric breakdown region A4 in the partial breakdown discharge described later, but has a dotted shape (or spherical shape).

Here, if a current capacity that can be emitted per unit time from a power supply (voltage application circuit 4) to between the pair of electrodes is sufficiently large, the discharge path formed once is maintained without interruption, and as described above, the corona discharge progresses to the glow discharge or the arc discharge.

Next, full path breakdown discharge will be described with reference to FIG. 9B.

As illustrated in FIG. 9B, the full path breakdown discharge is a discharge form in which a phenomenon that the corona discharge progresses to the full path breakdown between the pair of electrodes (discharge electrode 1 and counter electrode 2) is intermittently repeated. That is, in the full path breakdown discharge, discharge path L1 in which dielectric breakdown is entirely generated between discharge electrode 1 and counter electrode 2 is generated between discharge electrode 1 and counter electrode 2. At this time, region A2 having dielectric breakdown as a whole may be generated between discharge part 11 of discharge electrode 1 and counter electrode 2 (corner portion 222 of any one of projecting electrode parts 22). Region A2 is not partially generated as in each of first dielectric breakdown region A3 and second dielectric breakdown region A4 in the partial breakdown discharge described later, but is generated so as to connect discharge part 11 of discharge electrode 1 and counter electrode 2.

The term "dielectric breakdown" used in the present disclosure means that electrical insulation of an insulator (including a gas) that isolates conductors from each other is broken, and an insulation state cannot be maintained. The dielectric breakdown of the gas occurs, for example, because ionized molecules are accelerated by an electric field, collide with other gas molecules, and ionize, and an ion concentration rapidly increases to cause gas discharge.

In addition, although the full path breakdown discharge is accompanied by dielectric breakdown (full path breakdown) between the pair of electrodes (discharge electrode 1 and counter electrode 2), the dielectric breakdown is not continuously generated, but the dielectric breakdown is intermittently generated. Therefore, a discharge current generated between the pair of electrodes (discharge electrode 1 and counter electrode 2) is also intermittently generated. That is, as described above, in a case where the power supply (voltage application circuit 4) does not have a current capacity necessary for maintaining discharge path L1, the voltage applied between the pair of electrodes decreases as soon as the corona discharge progresses to the full path breakdown, and discharge path L1 is interrupted to stop the discharge. The "current capacity" referred to herein is a capacity of a current that can be released in a unit time. By repeating such generation and stop of the discharge, a discharge current intermittently flows. As described above, the full path breakdown discharge is different from the glow discharge and the arc discharge in which dielectric breakdown is continuously generated (that is, a discharge current is continuously generated) in that a state of high discharge energy and a state of low discharge energy are repeated.

Next, the partial breakdown discharge will be described with reference to FIG. 9C.

In the partial breakdown discharge, electric discharge device 10 first generates local corona discharge in discharge part 11 of discharge electrode 1. In the present exemplary embodiment, since discharge electrode 1 is on the negative electrode (ground) side, the corona discharge generated in discharge part 11 of discharge electrode 1 is a negative corona. Electric discharge device 10 develops the corona discharge generated in discharge part 11 of discharge electrode 1 to discharge with higher energy. Due to this high-energy discharge, discharge path L1 is formed between discharge electrode 1 and counter electrode 2 in which dielectric breakdown is partially generated.

Further, the partial breakdown discharge is discharge which is accompanied by partial dielectric breakdown between the pair of electrodes (discharge electrode 1 and counter electrode 2), but is not discharge in which dielectric breakdown is continuously generated, but dielectric breakdown is intermittently generated. Therefore, a discharge current generated between the pair of electrodes (discharge electrode 1 and counter electrode 2) is also intermittently generated. That is, in a case where the power supply (voltage application circuit 4) does not have a current capacity necessary for maintaining discharge path L1, the voltage applied between the pair of electrodes decreases as soon as the corona discharge progresses to the partial breakdown discharge, and discharge path L1 is interrupted to stop the discharge. By repeating such generation and stop of the discharge, a discharge current intermittently flows. As described above, the partial breakdown discharge is different from the glow discharge and the arc discharge in which dielectric breakdown is continuously generated (that is, a discharge current is continuously generated) in that a state of high discharge energy and a state of low discharge energy are repeated.

More specifically, electric discharge device 10 generates discharge between discharge electrode 1 and counter electrode 2 by applying application voltage V1 between discharge electrode 1 and counter electrode 2 disposed so as to face each other with a gap interposed therebetween. At the time of occurrence of discharge, discharge path L1 is formed between discharge electrode 1 and counter electrode 2, discharge path L1 being partially subjected to dielectric breakdown. As illustrated in FIG. 9C, discharge path L1 formed at this time includes first dielectric breakdown region A3 generated around discharge electrode 1 and second dielectric breakdown region A4 generated around counter electrode 2.

That is, discharge path L1 whose dielectric breakdown is partially (locally) formed rather than entirely is formed between discharge electrode 1 and counter electrode 2. As described above, in the partial breakdown discharge, discharge path L1 formed between discharge electrode 1 and counter electrode 2 does not lead to the full path breakdown but is a path in which dielectric breakdown is partially generated.

Here, first dielectric breakdown region A3 and second dielectric breakdown region A4 exist apart from each other so as not to contact each other. In other words, discharge path L1 includes a region (insulating region) not subjected to the dielectric breakdown at least between first dielectric breakdown region A3 and second dielectric breakdown region A4. Therefore, in the partial breakdown discharge, a space between discharge electrode 1 and counter electrode 2 does not reach the full path breakdown, and a discharge current flows through discharge path L1 in a state of partial dielectric breakdown. In short, even in discharge path L1 in which the partial dielectric breakdown is generated, in other words, even in discharge path L1 in which the dielectric breakdown is not partially generated, the discharge current flows between discharge electrode 1 and counter electrode 2 through discharge path L1, and the discharge is generated.

Here, second dielectric breakdown region A4 is basically generated around a portion of counter electrode 2 where a distance (spatial distance) to discharge part 11 is the shortest. In the present exemplary embodiment, since counter electrode 2 has shortest distance D2 (see FIG. 1B) to discharge part 11 at corner portion 222 of projecting electrode part 22, second dielectric breakdown region A4 is generated around corner portion 222. That is, projecting electrode part 22 illustrated in FIG. 9C actually corresponds to corner portion 222.

In the full path breakdown discharge (see FIG. 9B) or the partial breakdown discharge (see FIG. 9C), radicals are generated with larger energy than in the corona discharge (see FIG. 9A), and a large amount of radicals about 2 to 20 times larger than in the corona discharge are generated. The radicals generated in this manner constitute a basis for not only sterile filtration, odor removal, moisture keeping, freshness keeping, and virus inactivation, but also exerting useful effects in various situations. Here, ozone is also generated when the radicals are generated by the full path breakdown discharge or the partial breakdown discharge. However, in the full path breakdown discharge or the partial breakdown discharge, the radicals are generated about 2 to 20 times as large as those in the corona discharge, whereas an amount of the generated ozone is suppressed to about the same level as that in the corona discharge.

In addition, in the partial breakdown discharge (see FIG. 9C), the disappearance of radicals due to an excessive energy can be suppressed as compared with the full path breakdown discharge (see FIG. 9B), and a radical generation efficiency can be improved as compared with the full path breakdown discharge. That is, in the full path breakdown discharge, since the energy related to the discharge is too high, a part of the generated radicals may disappear, leading to a decrease in the generation efficiency of the active ingredient. On the other hand, in the partial breakdown discharge, since the energy related to the discharge is suppressed to be small as compared with the full path breakdown discharge, it is possible to reduce the amount of radicals lost due to exposure to the excessive energy, and improve the radical generation efficiency.

Further, in the partial breakdown discharge, concentration of the electric field is loosened as compared with the full path breakdown discharge. Therefore, in the full path breakdown discharge, a large discharge current instantaneously flows between discharge electrode 1 and counter electrode 2 through the discharge path in which a full path is broken, and an electrical resistance at that time is very small. On the other hand, in the partial breakdown discharge, the concentration of the electric field is loosened, so that the maximum value of the current instantaneously flowing between discharge electrode 1 and counter electrode 2 is suppressed to be smaller than that in the full path breakdown discharge at the time of forming discharge path L1 in which dielectric breakdown is partially generated. As a result, in the partial breakdown discharge, generation of nitride oxide (NOx) is suppressed, and an electric noise is further suppressed to be small as compared with the full path breakdown discharge.

Furthermore, in the present exemplary embodiment, as described above, counter electrode 2 includes the plurality of (here, four) projecting electrode parts 22, and distance D2 (see FIG. 1B) from each projecting electrode part 22 to discharge electrode 1 is equal in the plurality of projecting electrode parts 22. Therefore, dielectric breakdown region A2 or second dielectric breakdown region A4 is generated around corner portion 222 of any one of projecting electrode parts 22 among the plurality of projecting electrode parts 22. Projecting electrode part 22 where dielectric breakdown region A2 or second dielectric breakdown region A4 is generated is not limited to specific projecting electrode part 22, and is randomly determined among the plurality of projecting electrode parts 22.

(2.5) Frequency of Liquid

Next, a principle of increasing a frequency of liquid 50 will be described.

In the present exemplary embodiment, as described above, liquid 50 held by discharge part 11 of discharge electrode 1 extends and contracts along central axis P1 of discharge electrode 1 (that is, in the Z axis direction) by receiving the force of the electric field. Further, even in a state where liquid 50 is contracted, by applying to liquid 50 a bias in a direction in which liquid 50 is attracted to peripheral electrode part 21, the deformation amount of liquid 50 due to the mechanical vibration of liquid 50 is suppressed to be slightly small. Accordingly, electric discharge device 10 according to the present exemplary embodiment increases the frequency of liquid 50 to improve the generation efficiency of the active ingredient.

That is, peripheral electrode part 21 and projecting electrode part 22 of counter electrode 2 where the electric field acts with liquid 50 are always located on the positive side of the Z axis as viewed from liquid 50, and a force for attracting liquid 50 in the positive direction of the Z axis can be always applied. As described above, according to electric discharge device 10, a bias that pulls liquid 50 toward counter electrode 2 can always be applied to liquid 50 in the direction along central axis P1 of discharge electrode 1 (that is, the Z axis direction). Therefore, according to electric discharge device 10, the deformation amount of liquid 50 due to the mechanical vibration of liquid 50 is suppressed to be small, and as a result, the frequency of liquid 50 can be increased, and the generation efficiency of the active ingredient can be improved.

By the way, in electric discharge device 10 according to the present exemplary embodiment, voltage application circuit 4 varies application voltage V1 at a drive frequency according to the natural frequency of liquid 50. That is, as described above, the drive frequency, which is a frequency of the variation of application voltage V1, is set to a value within a predetermined range including a resonance frequency (the natural frequency) of liquid 50 held in discharge electrode 1, that is, a value near the resonance frequency of liquid 50. As a result, the amount of deformation of liquid 50 becomes relatively large, and liquid 50 has a shape in which the tip portion (apex portion) of the Taylor cone generated when the electric field acts becomes more pointed (acute angle), so that discharge easily occurs in electric discharge device 10.

In the present exemplary embodiment, the drive frequency is higher than or equal to the natural frequency of liquid 50. In short, electric discharge device 10 according to the present exemplary embodiment can suppress the deformation amount of liquid 50 due to the mechanical vibration of liquid 50 to be slightly small, and increase the frequency of liquid 50. Therefore, by setting the drive frequency, which is a frequency of the variation of application voltage V1, to be higher than or equal to the natural frequency of liquid 50, the frequency of liquid 50 is increased as much as possible. Specifically, the drive frequency is preferably set to a value higher than or equal to a center frequency within a predetermined range in which a lower limit value and an upper limit value are defined with reference to the natural frequency (resonance frequency) of liquid 50. More preferably, the drive frequency is set near the upper limit value of the predetermined range. Accordingly, by applying to liquid 50 a bias in a direction in which liquid 50 is attracted to peripheral electrode part 21, the amount of deformation of liquid 50 due to the mechanical vibration of liquid 50 is suppressed to be slightly small, and the frequency of liquid 50 can be improved. As a result, in electric discharge device 10 according to the present exemplary embodiment, the frequency of liquid 50 can be increased, and the generation efficiency of the active ingredient can be improved.

(3) Modified Example

The first exemplary embodiment is merely one of various exemplary embodiments of the present disclosure. The first exemplary embodiment can be variously changed according to a design and the like as long as the object of the present disclosure can be achieved. The drawings referred to in the present disclosure are all schematic views, and ratios of the sizes and the thicknesses of the constituent elements in the drawings do not necessarily reflect actual dimensional ratios. Hereinafter, modified examples of the first exemplary embodiment will be listed. Modified examples described below can be appropriately combined and applied.

Counter electrode 2 may include an appropriate number of projecting electrode parts 22, not limited to four. For example, counter electrode 2 may include an odd number of projecting electrode parts 22. The number of projecting electrode parts 22 included in counter electrode 2 is not limited to four, and may be, for example, one, two, three, or five or more. Further, it is not essential to arrange the plurality of projecting electrode parts 22 at equal intervals in the circumferential direction of opening portion 23, and the plurality of projecting electrode parts 22 may be arranged at appropriate intervals in the circumferential direction of opening portion 23.

In electric discharge device 10, liquid supply unit 5 for generating the charged microparticle liquid may be omitted. In this case, electric discharge device 10 generates air ions by discharge (full path breakdown discharge or partial breakdown discharge) generated between discharge electrode 1 and counter electrode 2.

Liquid supply unit 5 is not limited to the configuration in which discharge electrode 1 is cooled to generate dew condensation water on discharge electrode 1 as in the first exemplary embodiment. Liquid supply unit 5 may be configured to supply liquid 50 from a tank to discharge electrode 1 using, for example, a capillary phenomenon or a supply mechanism such as a pump. Further, liquid 50 is not limited to water (including dew condensation water), and may be a liquid other than water.

Furthermore, voltage application circuit 4 may be configured to apply a high voltage between discharge electrode 1 and counter electrode 2 with discharge electrode 1 as a positive electrode (plus) and counter electrode 2 as a negative electrode (ground). Further, since a potential difference (voltage) only needs to be generated between discharge electrode 1 and counter electrode 2, voltage application circuit 4 may apply a negative voltage to electrode device 3 by setting an electrode (positive electrode) on a high potential side to a ground and setting an electrode (negative electrode) on a low potential side to a negative potential. That is, voltage application circuit 4 may use discharge electrode 1 as a ground and counter electrode 2 as a negative potential, or may use discharge electrode 1 as a negative potential and counter electrode 2 as a ground.

Furthermore, limiting resistor R1 may be inserted between voltage generation circuit 41 and discharge electrode 1. In this case, since discharge electrode 1 is a negative electrode (ground), limiting resistor R1 is inserted between an output terminal on a low potential side of voltage generation circuit 41 and electrode device 3. Alternatively, when discharge electrode 1 is a positive electrode (plus) and counter electrode 2 is a negative electrode (ground), limiting resistor R1 may be inserted between an output terminal on a high potential side or a low potential side of voltage generation circuit 41 and electrode device 3. Further, limiting resistor R1 is not an essential component, and may be omitted as appropriate.

Furthermore, discharge electrode 1 and counter electrode 2 are not limited to a titanium alloy (Ti alloy), and as an example, may be a copper alloy such as a copper-tungsten alloy (Cu—W alloy). In addition, discharge electrode 1 is not limited to a tapered shape, and may have, for example, a shape in which a tip bulges.

Further, the high voltage applied from voltage application circuit 4 to electrode device 3 is not limited to about 6.0 kV, and is appropriately set according to, for example, the shapes of discharge electrode 1 and counter electrode 2, the distance between discharge electrode 1 and counter electrode 2, or the like.

Furthermore, a function similar to that of voltage application circuit 4 of the first exemplary embodiment may be embodied by a control method of voltage application circuit 4, a computer program, or a recording medium in which the computer program is recorded. That is, the function corresponding to control circuit 43 may be embodied by a method of controlling voltage application circuit 4, a computer program, a recording medium recording the computer program, or the like.

Also, in the comparison between two values, "more than or equal to" includes both a case where the two values are equal to each other and a case where one of the two values exceeds the other. However, the present invention is not limited thereto, and the term "greater than or equal to" as used herein may be synonymous with "greater than" including only a case where one of the two values exceeds the other. That is, whether or not a case where the two values are equal to each other is included can be arbitrarily changed depending on the setting of a threshold value or the like, and thus there is no technical difference between "greater than or equal to" and "greater than". Similarly, "less than" may have the same meaning as "less than or equal to".

Second Exemplary Embodiment

As illustrated in FIGS. 10A to 10D, electric discharge device 10 according to the present exemplary embodiment is different from electric discharge device 10 according to the first exemplary embodiment in shapes of counter electrodes 2A to 2D. Hereinafter, the same configurations as those of the first exemplary embodiment are denoted by the same reference marks, and the description thereof will be appropriately omitted. FIGS. 10A to 10D are schematic plan views illustrating counter electrodes 2A to 2D according to the second exemplary embodiment.

Figure 10A:
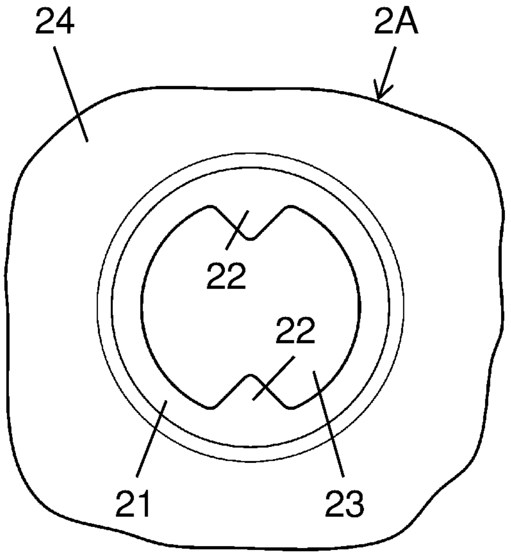
FIG. 10A is a schematic plan view illustrating a counter electrode of an electrode device according to a second exemplary embodiment.

Counter electrode 2A illustrated in FIG. 10A is disposed such that a plurality of (here, two) projecting electrode parts 22 are arranged side by side in the Y axis direction. In the example of FIG. 10A, projecting electrode part 22 has a triangular shape when viewed from one side of central axis P1 of discharge electrode 1, that is, in a plan view. The term "triangular shape" used in the present disclosure is not limited to a triangle having three vertices, and includes a shape in which a distal end is an R surface (curved surface) as in projecting electrode part 22 illustrated in FIG. 10A.

Figure 10B:
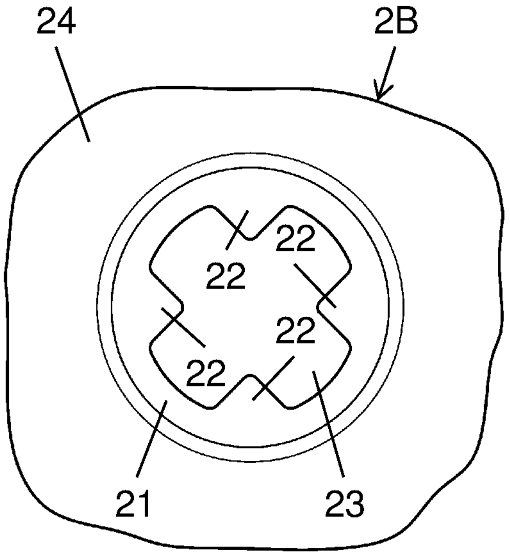
FIG. 10B is a schematic plan view illustrating the counter electrode of the electrode device according to the second exemplary embodiment.

Counter electrode 2B illustrated in FIG. 10B has four projecting electrode parts 22 each having a triangular shape in a plan view. In FIG. 10B, when a positive direction of the X axis (rightward) is defined as "0 degrees" and a positive direction of the Y axis (upward) is defined as "90 degrees", four projecting electrode parts 22 are respectively provided at positions of 0 degrees, 90 degrees, 180 degrees, and 270 degrees.

Figure 10C:
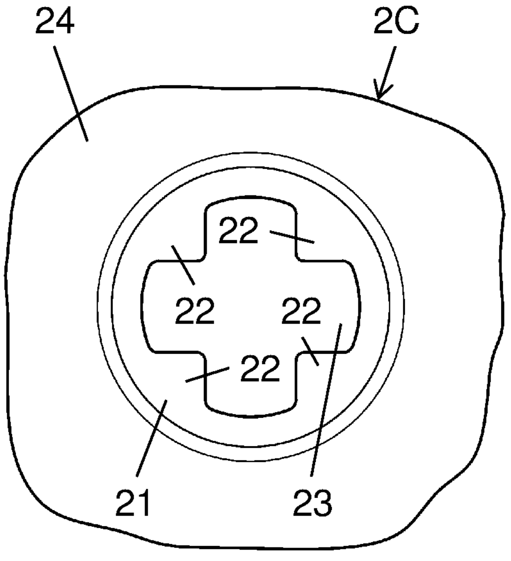
FIG. 10C is a schematic plan view illustrating the counter electrode of the electrode device according to the second exemplary embodiment.

Counter electrode 2C illustrated in FIG. 10C has four projecting electrode parts 22 each having a triangular shape in a plan view. In FIG. 10C, when a positive direction of the X axis (rightward) is defined as "0 degrees" and a positive direction of the Y axis (upward) is defined as "90 degrees", four projecting electrode parts 22 are respectively provided at positions of 45 degrees, 135 degrees, 225 degrees, and 315 degrees.

Figure 10D:
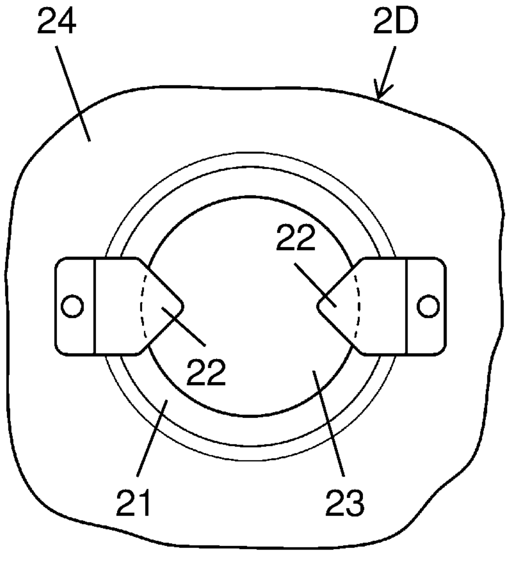
FIG. 10D is a schematic plan view illustrating the counter electrode of the electrode device according to the second exemplary embodiment.

In counter electrode 2D illustrated in FIG. 10D, peripheral electrode part 21 and projecting electrode part 22 are separate bodies. Even in this case, projecting electrode part 22 projects toward central axis P1 of discharge electrode 1 from a part of peripheral electrode part 21 in the circumferential direction as viewed from one side of central axis P1 of discharge electrode 1. In this case, projecting electrode part 22 is fixed to peripheral electrode part 21 by an appropriate joining method (welding, screw fixing, caulking fixing, etc.).

Furthermore, in the present exemplary embodiment, extending part 25 extending outward from peripheral electrode part 21 is omitted, but the present invention is not limited to this configuration, and counter electrodes 2A to 2D may include extending part 25.

Further, the present invention is not limited to the examples of FIGS. 10A to 10D, and discharge electrode 1 and counter electrode 2 in electrode device 3 can adopt appropriate shapes. As an example, peripheral electrode part 21 of counter electrode 2 may adopt an appropriate shape such as a circular shape, an elliptical shape, a triangular shape, a quadrangular shape, or another polygonal shape in a plan view. Any numerical values can be adopted as an outer diameter, an inner diameter, and a thickness of peripheral electrode part 21. Similarly, projecting electrode part 22 of counter electrode 2 may adopt an appropriate shape such as a needle shape, a triangular shape, a quadrangular shape, or another polygonal shape in a plan view. Any numerical values can be adopted as a projecting amount, a width, and a thickness of projecting electrode part 22.

Various configurations (including modified examples) described in the second exemplary embodiment can be adopted by appropriately combining with various configurations (including modified examples) described in the first exemplary embodiment.

SUMMARY

As described above, electric discharge device (10) according to a first aspect includes discharge electrode (1), counter electrode (2, 2A to 2D), voltage application circuit (4), and liquid supply unit (5). Discharge electrode (1) is a columnar electrode. Counter electrode (2, 2A to 2D) faces discharge electrode (1). Voltage application circuit (4) generates discharge by applying application voltage (V1) between discharge electrode (1) and counter electrode (2, 2A to 2D). Liquid supply unit (5) supplies liquid (50) to discharge electrode (1). Liquid (50) extends and contracts along central axis (P1) of discharge electrode (1) by the discharge. Counter electrode (2, 2A to 2D) includes peripheral electrode part (21) and projecting electrode part (22). Peripheral electrode part (21) protrudes to a side opposite to discharge electrode (1), and opening portion (23) is formed on a distal end surface. Projecting electrode part (22) projects from peripheral electrode part (21) into opening portion (23). In a direction along central axis (P1) of discharge electrode (1), a tip of liquid (50) in a state where liquid (50) extends is located at the same position as outer peripheral edge (210) of peripheral electrode part (21) or located closer to discharge electrode (1) than outer peripheral edge (210).

According to this aspect, peripheral electrode part (21) protrudes to the side opposite to discharge electrode (1), and opening portion (23) is formed on the distal end surface of the peripheral electrode part. Therefore, a force for attracting liquid (50) held by discharge electrode (1) to a side of peripheral electrode part (21) acts on the liquid by an electric field. In a direction along central axis (P1) of discharge electrode (1), a tip of liquid (50) in a state where liquid (50) extends is located at the same position as outer peripheral edge (210) of peripheral electrode part (21) or located closer to discharge electrode (1) than outer peripheral edge (210). As a result, when liquid (50) held by discharge electrode (1) mechanically vibrates, for example, a force in a direction attracting liquid (50) to peripheral electrode part (21) is continuously applied to the liquid, whereby an amplitude of liquid (50) can be suppressed to be small. That is, a deformation amount of liquid (50) due to the mechanical vibration of liquid (50) is suppressed to be small, and as a result, a frequency of liquid (50) can be raised, and the generation efficiency of the active ingredient can be improved.

In electric discharge device (10) according to a second aspect, in the first aspect, projecting electrode part (22) has an arc shape as viewed from one side of central axis (P1) of discharge electrode (1).

According to this aspect, concentration of the electric field in projecting electrode part (22) can be alleviated.

In electric discharge device (10) according to a third aspect, in the first or second aspect, counter electrode (2, 2A to 2D) has three or more projecting electrode parts (22).

According to this aspect, discharge can be generated dispersedly at greater than or equal to three projecting electrode parts (22).

In electric discharge device (10) according to a fourth aspect, in any one of the first to third aspects, distance (D4, D6) from liquid (50) to projecting electrode part (22) is less than or equal to distance (D3, D5) from liquid (50) to peripheral electrode part (21).

According to this aspect, the electric field tends to concentrate between liquid (50) and projecting electrode part (22), and the discharge tends to be generated between liquid (50) and counter electrode (2, 2A to 2D).

In electric discharge device (10) according to a fifth aspect, in the fourth aspect, distance (D4, D6) from liquid (50) to projecting electrode part (22) is less than or equal to 9/10 of distance (D3, D5) from liquid (50) to peripheral electrode part (21).

According to this aspect, the electric field tends to concentrate between liquid (50) and projecting electrode part (22), and the discharge tends to be generated between liquid (50) and counter electrode (2, 2A to 2D).

In electric discharge device (10) according to a sixth aspect, in any one of the first to fifth aspects, in virtual plane (VP1), inclination angle (01, 02) of a virtual line connecting liquid (50) and a distal end of projecting electrode part (22) with respect to central axis (P1) of discharge electrode (1) is less than or equal to 67 degrees. Virtual plane (VP1) includes central axis (P1) of discharge electrode (1) and a tip of projecting electrode part (22).

According to this aspect, the electric field tends to concentrate between liquid (50) and projecting electrode part (22), and in particular, a force for attracting liquid (50) to counter electrode (2, 2A to 2D) tends to act on liquid (50) along central axis (P1) of discharge electrode (1).

In electric discharge device (10) according to a seventh aspect, in any one of the first to sixth aspects, counter electrode (2, 2A to 2D) further includes extending part (25) extending outward from peripheral electrode part (21). Extending part (25) is formed so as to be farther from discharge electrode (1) in a direction along central axis (P1) of discharge electrode (1) as the extending part is farther from peripheral electrode part (21).

According to this aspect, it is possible to avoid excessive concentration of the electric field to the outside of peripheral electrode part (21), and an appropriate electric field contributing to discharge is likely to be generated.

In electric discharge device (10) according to an eighth aspect, in any one of the first to seventh aspects, in counter electrode (2, 2A to 2D), at least one of the following four portions includes a curved shape. The first portion is distal end surface (221) of projecting electrode part (22) viewed from one side of central axis (P1) of discharge electrode (1). The second portion is corner portion (222) of projecting electrode part (22) on a side of discharge electrode (1) in virtual plane (VP1) including central axis (P1) of discharge electrode (1) and a tip of projecting electrode part (22). The third portion is corner portion (211) of peripheral electrode part (21) on the side of discharge electrode (1) in virtual plane (VP1) including central axis (P1) of discharge electrode (1) and the tip of projecting electrode part (22). The fourth portion is inner surface (212) of peripheral electrode part (21) in virtual plane (VP1) including central axis (P1) of discharge electrode (1) and the tip of projecting electrode part (22).

According to this aspect, it is possible to avoid excessive concentration of the electric field, and an appropriate electric field contributing to discharge is likely to be generated.

In electric discharge device (10) according to a ninth aspect, in the eighth aspect, the curved shape of distal end surface (221) of projecting electrode part (22) is larger in radius of curvature than the curved shape of corner portion (222) of projecting electrode part (22) on a side of discharge electrode (1).

According to this aspect, it is possible to avoid excessive concentration of the electric field on distal end surface (221) of projecting electrode part (22), and an appropriate electric field contributing to discharge is likely to be generated.

In electric discharge device (10) according to a tenth aspect, in the eighth or ninth aspect, the curved shape of distal end surface (221) of projecting electrode part (22) is smaller in radius of curvature than the curved shape of inner surface (212) of peripheral electrode part (21).

According to this aspect, it is possible to avoid excessive concentration of the electric field on inner surface (212) of peripheral electrode part (21), and an appropriate electric field contributing to discharge is likely to be generated.

In electric discharge device (10) according to an eleventh aspect, in any one of the first to tenth aspects, voltage application circuit (4) varies application voltage (V1) at a drive frequency according to a natural frequency of liquid (50).

According to this aspect, the variation of application voltage (V1) is likely to efficiently contribute to the mechanical vibration of liquid (50).

In electric discharge device (10) according to a twelfth aspect, in the eleventh aspect, the drive frequency is higher than or equal to the natural frequency of liquid (50).

According to this aspect, the frequency of liquid (50) can be increased, and the generation efficiency of the active ingredient can be improved.

An electrode device according to a thirteenth aspect is an electrode device used in electric discharge device (10) according to any one of the first to twelfth aspects, wherein the electrode device includes discharge electrode (1) and counter electrode (2, 2A to 2D), and application voltage (V1) is applied from voltage application circuit (4).

According to this aspect, the generation efficiency of the active ingredient can be improved.

Electric discharge device (10) according to a fourteenth aspect includes discharge electrode (1), counter electrode (2, 2A to 2D), and voltage application circuit (4). Discharge electrode (1) is a columnar electrode. Counter electrode (2, 2A to 2D) faces discharge electrode (1). Voltage application circuit (4) generates discharge by applying application voltage (V1) between discharge electrode (1) and counter electrode (2, 2A to 2D). Counter electrode (2, 2A to 2D) includes peripheral electrode part (21) and projecting electrode part (22). Peripheral electrode part (21) protrudes to a side opposite to discharge electrode (1), and opening portion (23) is formed on a distal end surface. Projecting electrode part (22) projects from peripheral electrode part (21) into opening portion (23). In a direction along central axis (P1) of discharge electrode (1), a tip of discharge electrode (1) is located closer to discharge electrode (1) than outer peripheral edge (210) of peripheral electrode part (21).

According to this aspect, the generation efficiency of the active ingredient can be improved.

The configurations according to the second to twelfth aspect are not essential to electric discharge device (10), and can be omitted as appropriate.

The electric discharge device and the electrode device can be applied to various applications such as a refrigerator, a washing machine, a dryer, an air conditioner, an electric fan, an air cleaner, a humidifier, a facial treatment device, and an automobile.

REFERENCE MARKS IN THE DRAWINGS

1 discharge electrode
2, 2A to 2D counter electrode
4 voltage application circuit
5 liquid supply unit
10 electric discharge device
21 peripheral electrode part
22 projecting electrode part
23 opening portion
25 extending part
50 liquid
210 outer peripheral edge
211 corner portion
212 inner surface
221 distal end surface
222 corner portion
D3 to D6 distance
V1 application voltage
VP1 virtual plane

The invention claimed is:

1. An electric discharge device comprising:

a columnar discharge electrode;

a counter electrode facing the columnar discharge electrode;

a voltage application circuit that generates discharge by applying an application voltage between the columnar discharge electrode and the counter electrode; and a liquid supply unit that supplies liquid to the columnar discharge electrode, wherein:

the liquid extends and contracts along a central axis of the columnar discharge electrode by the discharge generated by the voltage application circuit, the counter electrode includes:

a peripheral electrode part that protrudes to a side opposite to the columnar discharge electrode and includes an opening portion formed in a distal end surface of the peripheral electrode part;

an extending part extending outward from the peripheral electrode part and including an annular shape groove;

a flat plate part connected to the extending part; and a projecting electrode part projecting from the peripheral electrode part into the opening portion, when the liquid is extended, a tip of the liquid is located between the columnar discharge electrode and a position corresponding to an outer peripheral edge of the peripheral electrode part, inclusive, in a view along a central axis of the columnar discharge electrode, the annular shape groove includes an inner portion connected to the peripheral electrode part and an outer portion connected to the flat plate part, the outer portion is formed so as to be farther from the columnar discharge electrode in the direction along a central axis of the columnar discharge electrode as the outer portion is farther from the peripheral electrode part, and the inner portion is formed so as to be closer to the columnar discharge electrode in the direction along the central axis of the columnar discharge electrode as the inner portion is closer to the peripheral electrode part.

2. The electric discharge device according to claim 1, wherein the projecting electrode part has an arc shape when viewed from one side of the central axis of the columnar discharge electrode.

3. The electric discharge device according to claim 1, wherein the counter electrode includes greater than or equal to three of the projecting electrode parts each being the projecting electrode part.

4. The electric discharge device according to claim 1, wherein a distance from the liquid to the projecting electrode part is less than or equal to a distance from the liquid to the peripheral electrode part.

5. The electric discharge device according to claim 4, wherein the distance from the liquid to the projecting electrode part is less than or equal to 9/10 of the distance from the liquid to the peripheral electrode part.

6. The electric discharge device according to claim 1, wherein in a virtual plane including the central axis of the columnar discharge electrode and a tip of the projecting electrode part, an inclination angle of a virtual line connecting the liquid and the tip of the projecting electrode part with respect to the central axis of the columnar discharge electrode is less than or equal to 67 degrees.

7. The electric discharge device according to claim 1, wherein in the counter electrode, at least one of a distal end surface of the projecting electrode part as viewed from one side of the central axis of the columnar discharge electrode, and a corner portion of the projecting electrode part on a side of the columnar discharge electrode, a corner portion of the peripheral electrode part on the side of the columnar discharge electrode, and an inner surface of the peripheral electrode part in a virtual plane including the central axis of the columnar discharge electrode and the distal end of the projecting electrode part includes a curved shape.

8. The electric discharge device according to claim 7, wherein a curvature radius of a curved shape of the distal end surface of the projecting electrode part is larger than a curvature radius of a curved shape of the corner portion of the projecting electrode part on the side of the columnar discharge electrode.

9. The electric discharge device according to claim 7, wherein the curvature radius of the curved shape of the distal end surface of the projecting electrode part is smaller than a curvature radius of a curved shape of the inner surface of the peripheral electrode part.

10. The electric discharge device according to claim 1, wherein the voltage application circuit varies the application voltage at a drive frequency according to a natural frequency of the liquid.

11. The electric discharge device according to claim 10, wherein the drive frequency is a frequency higher than or equal to the natural frequency of the liquid.

12. An electrode device used in the electric discharge device according to claim 1, wherein the columnar discharge electrode and the counter electrode are provided, and the application voltage is applied from the voltage application circuit.

13. An electric discharge device comprising:

a columnar discharge electrode;

a counter electrode facing the columnar discharge electrode; and a voltage application circuit that generates discharge by applying an application voltage between the columnar discharge electrode and the counter electrode, wherein:

the counter electrode includes:

a peripheral electrode part that protrudes to a side opposite to the columnar discharge electrode and includes an opening portion formed in a distal end surface of the peripheral electrode part;

an extending part extending outward from the peripheral electrode part and including an annular shape groove;

a flat plate part connected to the extending part; and a projecting electrode part projecting from the peripheral electrode part into the opening portion, a tip of the columnar discharge electrode is located between the columnar discharge electrode and a position corresponding to an outer peripheral edge of the peripheral electrode part, inclusive, in a view along a central axis of the columnar discharge electrode, the annular shape groove includes an inner portion connected to the peripheral electrode part and an outer portion connected to the flat plate part, the outer portion is formed so as to be farther from the columnar discharge electrode in the direction along a central axis of the columnar discharge electrode as the outer portion is farther from the peripheral electrode part, and the inner portion is formed so as to be closer to the columnar discharge electrode in the direction along the central axis of the columnar discharge electrode as the inner portion is closer to the peripheral electrode part.

14. The electric discharge device according to claim 1, wherein:

among the flat plate part, the extending part, the peripheral electrode part and the projecting electrode part, the flat plate part is located farthest from the discharge electrode in the direction along the central axis of the columnar discharge electrode.

15. The electric discharge device according to claim 13, wherein:

among the flat plate part, the extending part, the peripheral electrode part and the projecting electrode part, the flat plate part is located farthest from the discharge electrode in the direction along the central axis of the columnar discharge electrode.

* * * * *